(12) United States Patent
Song

(10) Patent No.: US 10,416,858 B2
(45) Date of Patent: Sep. 17, 2019

(54) ELECTRONIC DEVICE AND METHOD OF PROCESSING INFORMATION IN ELECTRONIC DEVICE

(71) Applicant: Samsung Electronics Co., Ltd., Gyeonggi-do (KR)

(72) Inventor: Ji-Hye Song, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 550 days.

(21) Appl. No.: 15/071,302

(22) Filed: Mar. 16, 2016

(65) Prior Publication Data

US 2016/0274766 A1  Sep. 22, 2016

(30) Foreign Application Priority Data

Mar. 18, 2015  (KR) ........................ 10-2015-0037499

(51) Int. Cl.

| G06F 3/048 | (2013.01) |
| G06F 3/0484 | (2013.01) |
| G06F 17/22 | (2006.01) |
| H04L 29/08 | (2006.01) |
| G06F 16/955 | (2019.01) |

(52) U.S. Cl.
CPC ...... *G06F 3/04842* (2013.01); *G06F 16/9562* (2019.01); *G06F 17/2205* (2013.01); *G06F 17/2235* (2013.01); *G06F 17/2247* (2013.01); *H04L 67/02* (2013.01)

(58) Field of Classification Search
CPC ............. G06F 17/2205; G06F 17/2235; G06F 17/2247; G06F 17/30884; G06F 3/04842; H04L 67/02
See application file for complete search history.

(56) References Cited

U.S. PATENT DOCUMENTS

| 7,814,425 B1 | 10/2010 | O'Shaugnessy et al. |
| 2009/0178006 A1 | 7/2009 | Lemay et al. |
| 2009/0307086 A1 | 12/2009 | Adams et al. |
| 2011/0145698 A1 | 6/2011 | Penov et al. |
| 2012/0216102 A1 | 8/2012 | Malla |
| 2013/0004138 A1 | 1/2013 | Kilar et al. |

(Continued)

FOREIGN PATENT DOCUMENTS

| KR | 10-2008-0083763 A | 9/2008 |
| KR | 10-2011-0090853 A | 8/2011 |

(Continued)

OTHER PUBLICATIONS

International Search Report, dated Jun. 15, 2016.
European Search Report, dated Jul. 28, 2016.

*Primary Examiner* — Thanh T Vu
(74) *Attorney, Agent, or Firm* — Cha & Reiter, LLC.

(57) ABSTRACT

A method and electronic device are disclosed herein. The electronic device includes a display unit for displaying a web document and a processor. The processor may implement the method, including displaying a web document, in response to detecting selection of address information related to a web-based location of the displayed web document, selecting one or more contents included in the displayed web document, and storing the selected one or more contents in associating with the address information of the web document.

18 Claims, 26 Drawing Sheets

(56) References Cited

U.S. PATENT DOCUMENTS

| | | | |
|---|---|---|---|
| 2013/0138770 A1 | 5/2013 | Kim et al. | |
| 2013/0311902 A1 | 11/2013 | O'Shaugnessy et al. | |
| 2014/0189534 A1* | 7/2014 | Liu | G06F 3/01 |
| | | | 715/753 |
| 2016/0188744 A1* | 6/2016 | Ito | G06F 17/30896 |
| | | | 707/602 |

FOREIGN PATENT DOCUMENTS

| | | |
|---|---|---|
| KR | 10-2013-0065777 A | 6/2013 |
| KR | 10-2014-0015691 A | 2/2014 |

\* cited by examiner

ELECTRONIC DEVICE AND METHOD OF PROCESSING INFORMATION IN ELECTRONIC DEVICE

CLAIM OF PRIORITY

This application claims priority under 35 U.S.C. § 119(a) to Korean Application Serial No. 10-2015-0037499, which was filed in the Korean Intellectual Property Office on Mar. 18, 2015, the entire content of which is hereby incorporated by reference.

TECHNICAL FIELD

The present disclosure relates to an electronic device and a method of processing information in an electronic device.

BACKGROUND

Recently used various electronic devices may execute a web browser and receive various pieces of information from a server existing on the network.

When a web browser is executed, the electronic device may display a web document containing the information received from the server and also display address information (for example, a Uniform Resource Locator or "URL") related to a location which provides the web document in an address bar of the web browser.

SUMMARY

When users desire to share or edit information provided through a web document, the information may be shared or edited through copying of a link.

However, in the linked copy, the electronic device may copy a URL which merely includes text from the corresponding web document and thus the text may be displayed when a paste or link is executed. Accordingly, the receiving users may not be able to identify the information was intended to be shared within the web document through the copied URL alone. As a result, the users may click the displayed URL or input the URL into an address bar of the web browser to access the corresponding web document, thereby identifying the information through the web document itself.

Various embodiments of the present disclosure may provide an electronic device and a method of processing information in an electronic device, which, in response to a selection of address information related to a location of a web document, may executing storing and/or sharing of one or more contents included in the web document along with the address information of the web document.

In an aspect of the present disclosure, an electronic device includes a display unit configured to display a web document, and a processor operatively coupled to memory, the processor configured to: in response to detecting selection of address information related to a web-based location of the displayed web document, select one or more contents included in the displayed web document, and store in the memory the selected one or more contents in association with the address information of the displayed web document.

In an aspect of the present disclosure, a method of processing information in an electronic device includes: displaying a web document, in response to detecting selection of address information related to a web-based location of the displayed web document, selecting one or more contents included in the displayed web document, and storing the selected one or more contents in associating with the address information of the displayed web document.

In an aspect of the present disclosure, a non-transitory computer-readable recording medium includes a program, and the program includes executable instructions to cause a processor to perform operations when the program is executed by the processor. The operations include: displaying a web document, in response to detecting selection of address information related to a web-based location of the displayed web document, selecting one or more contents included in the displayed web document, and storing the selected one or more contents in association with the address information of the displayed web document.

An electronic device according to various embodiments can store, in response to a selection of information related to a location that provides a web document, selected contents to be matched with the address information related to the location that provides the displayed web document.

Further, an electronic device according to various embodiments can paste, display and/or transmit the selected contents as well as the address information related to the location that provides the displayed web document in order to allow a user to easily recognize which contents are included in the web document corresponding to the address information of the displayed web document including text.

BRIEF DESCRIPTION OF THE DRAWINGS

The present disclosure will be more apparent from the following detailed description taken in conjunction with the accompanying drawings, in which.

DETAILED DESCRIPTION

Figure 1:
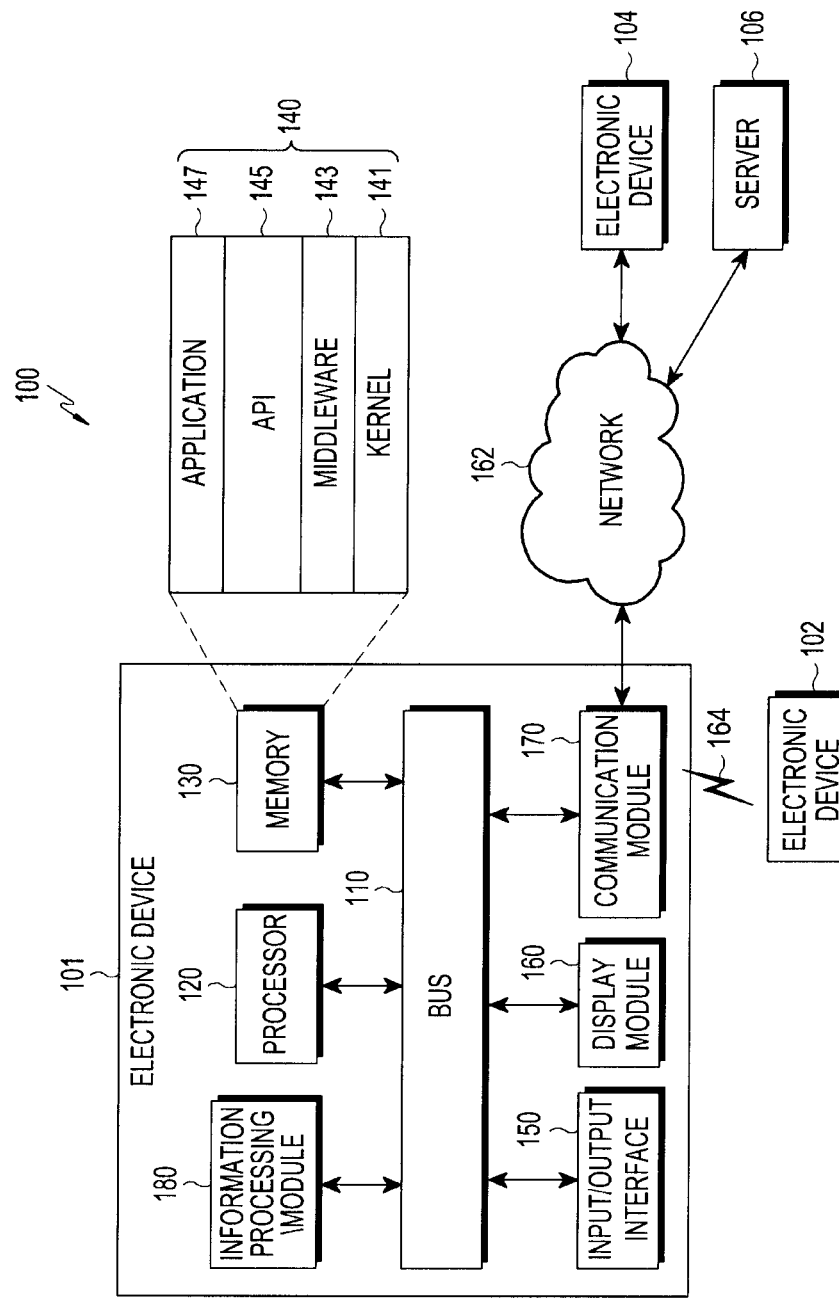
FIG. 1 illustrates a network environment according to various embodiments of the present disclosure.

Hereinafter, the present disclosure will be described with reference to the accompanying drawings. The present disclosure may have various embodiments, and modifications and changes may be made therein. Therefore, the present disclosure will be described in conjunction with particular embodiments shown in the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "include" or "may include" refers to existence of a corresponding function, operation, or element, and does not limit one or more additional functions, operations, or elements. In the present disclosure, the terms such as "include" and/or "have" may be construed to denote a certain characteristic, number, step, operation, constituent element, element or a combination thereof, but may not be construed to exclude the existence of or a possibility of addition of one or more other characteristics, numbers, steps, operations, constituent elements, elements or combinations thereof.

In the present disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) for performing the corresponding operations or a generic-purpose processor (e.g., central processing unit (CPU) or application processor (AP)) that can perform the corresponding operations by executing one or more software programs stored in a memory device.

The terms used in the present disclosure are used to describe specific embodiments, and are not intended to limit the present disclosure. As used herein, singular forms may include plural forms as well unless the context clearly indicates otherwise.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to some embodiments, the electronic device may be a smart home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, an electronic device according to various embodiments of the present disclosure will be described with reference to the accompanying drawings. In various embodiments, the term "user" may indicate a person using an electronic device or a device (e.g. an artificial intelligence electronic device) using an electronic device.

FIG. 1 illustrates a network environment 100 including an electronic device 101 according to various embodiments. Referring to FIG. 1, the electronic device 101 may include at least one of a bus 110, a processor 120, a memory 130, an input/output interface 150, a display module 160, a communication module 170, and an information processing module 180. In some embodiments, at least one of the elements of the electronic device 101 may be omitted, or other elements may be additionally included in the electronic device 101.

The bus 110 may be a circuit to connect the above-described elements with each other and to transfer communication (for example, control messages) among the above-described elements.

The processor 120 may receive instructions from the above-described elements (for example, at least one of the memory 130, the input/output interface 150, the display module 160, the communication module 170, the information processing module 180 and the like) through, for example, the bus 110, then decode the received instructions and perform calculation or data processing according to the decoded instructions. The processor 120 included in the electronic device according to various embodiments may process a program command for executing various embodiments. For example, the processor 120 may be a single-threaded processor or a multi-threaded processor. Further, the processor 120 may process an instruction stored in the memory 130 or a storage device (not shown).

The memory 130 may store instructions or data received from or generated by the processor 120 or other elements (for example, at least one of the input/output interface 150, the display module 160, the communication module 170, the information processing module 180 and the like). The memory 130 may include programming modules, for example, a kernel 141, middleware 143, an Application Programming Interface (API) 145, applications 147, or the like. Each of the aforementioned programming modules may be formed of software, firmware, hardware, or a combination of at least two thereof.

The kernel 141 may control or manage system resources (for example, at least one of the bus 110, the processor 120, the memory 130, and the like) used to execute operations or functions implemented by the remaining other programming modules, for example, the middleware 143, the API 145, or the applications 147. Further, the kernel 141 may provide an interface through which the middleware 143, the API 145, and the applications 147 may access individual components of the electronic device 101 to control or manage them.

The middleware 143 may act as a relay to allow the API 145 or the applications 147 to communicate with the kernel 141 to exchange data. Further, in relation to task requests received from the application 147, the middleware 143 may control (for example, scheduling or load-balancing) the task requests by using, for example, a method of determining a sequence for using system resources (for example, at least one of the bus 110, the processor 120, the memory 130, and the like) of the electronic device 101 with respect to at least one application among the applications 147.

The API 145 is an interface by which the applications 147 can control a function provided by the kernel 141 or the middleware 143 and may include, for example, at least one interface or function (for example, an instruction) or a file control, a window control, image processing, or a character control.

According to various embodiments, the applications 147 may include a Short Message Service (SMS)/Multimedia Messaging Service (MMS) application, an email application, a calendar application, an alarm application, a health care application (for example, application measuring a quantity of exercise or blood sugar) or an environmental information application (for example, application providing information on pressure, humidity or temperature). Additionally or alternatively, the applications 147 may be an application related to the exchange of information between the electronic device 101 and external electronic devices (for example, an electronic device 104). The application related to exchanging information may include, for example, a notification relay application for transferring predetermined information to the external electronic device or a device management application for managing the external electronic device.

For example, the notification relay application may include a function of transferring notification information generated in other applications (for example, at least one of the SMS/MMS application, the e-mail application, the health care application, and the environmental information application) of the electronic device 101 to an external electronic device (for example, the electronic device 104). Additionally or alternatively, the notification relay application may, for example, receive notification information from an external electronic device (for example, the electronic device 104) and provide the same to a user. The device management application may, for example, manage (for example, install, delete, or update) a function for at least a part of the external electronic device (for example, the electronic device 104) communicating with the electronic device 101 (for example, turning on/off the external electronic device itself (or some elements thereof) or adjusting the brightness (or resolution) of a display), applications operating in the external electronic device, or services provided from the external electronic device (for example, a telephone call service or a message service).

According to various embodiments, the applications 147 may include applications, which are designated according to attributes (for example, the type of electronic device) of the external electronic device (for example, the electronic device 104). For example, when the external electronic device is an MP3 player, the applications 147 may include an application related to the reproduction of music. Similarly, when the external electronic device is a mobile medical device, the applications 147 may include an application related to health care. According to an embodiment, the applications 147 may include at least one of an application designated to the electronic device 101 and an application received from an external electronic device (for example, the server 106 or the electronic device 104).

The input/output interface 150 may transfer instructions or data, input by a user through an input/output device (for example, a sensor, a keyboard, or a touch screen), to the processor 120, the memory 130, the communication module 170, or the information processing module 180 through, for example, the bus 110. For example, the input/output interface 150 may provide the processor 120 with data for a user's touch which is input through the touch screen. Further, through the input/output device (for example, a speaker or a display), the input/output interface 150 may output instructions or data received from the processor 120, the memory 130, the communication module 170, or the information processing module 180 through, for example, the bus 110. For example, the input/output interface 150 may output voice data processed by the processor 120 to the user through the speaker.

The display module 160 may display various pieces of information (for example, at least one of multimedia data and text data) to the user. Further, according to various embodiments of the present disclosure, the display module 160 may display, on a screen, an input window or an input pad through which various characters, numbers, and symbols can be input into the input window in various ways.

The communication module 170 may connect communication between the electronic device 101 and the external device (for example, electronic device 104 or server 106, or electronic device 102 through a direct communication link 164). For example, the communication module 170 may be connected to a network 162 through wireless or wired communication to communicate with the external device. The wireless communication may include at least one of, for example, Wi-Fi, Bluetooth (BT), Near Field Communication (NFC), Global Positioning System (GPS) and cellular communication (for example, at least one of LTE, LTE-A, CDMA, WCDMA, UMTS, WiBro, GSM and the like). The wired communication may include at least one of, for example, a Universal Serial Bus (USB), a High Definition Multimedia Interface (HDMI), Recommended Standard 232 (RS-232), and a Plain Old Telephone Service (POTS). The communication module 170 may include all types of communication schemes which have been widely known or will be developed in the future as well as the aforementioned communication schemes.

According to various embodiments, the network 162 may be a communication network (telecommunication network). The telecommunication network may include at least one of a computer network, the Internet, the Internet of Things, and a telephone network. According to various embodiments, a protocol 140 (for example, a transport lay protocol, data link layer protocol, or a physical layer protocol) for communication between the electronic device 101 and the external device may be supported in at least one of the applications 147, the application programming interface 145, the middleware 143, the kernel 141, and the communication module 170.

Although the electronic device 101 includes the communication module 170 to communicate with the external electronic device 104 or the server 106 through the network 162 in FIG. 1, the electronic device 101 may be implemented to independently operate therein without a separate communication function according to various embodiments of the present disclosure.

According to various embodiments, the server 106 may support the driving of the electronic device 101 by performing at least one of the operations (or functions) performed by the electronic device 101. For example, the server 106 may include an information processing server module which may support the processor 120 implemented in the electronic device 101. For example, the information processing server module may include one or more elements of the information processing module 180, and may perform at least one of the operations (or functions) performed by the information processing module 180 (or on behalf of the information processing module 180).

The information processing module 180 may process at least a part of information acquired from other elements (for example, at least one of the processor 120, the memory 130, the input/output interface 150, and the communication module 170), and may provide the processed information to the user through various methods.

Although the information processing module 180 is illustrated as a module separate from the processor 120 in FIG. 1, at least some of the information processing module 180 may be included in the processor 120, the memory 130, the input/output interface 150, the display module 160, or the communication module 170, or all functions of the information processing module 180 may be included in the shown processor 120 or another processor.

The information processing module 180 may process at least some of the information acquired from other elements (for example, at least one of the processor 120, the memory 130, the input/output interface 150, and the communication module 170), and may provide the processed information to the user through various methods. For example, the information processing module 180 may control at least some functions of the electronic device 101 by using the processor 120 or independently therefrom so that the electronic device 101 may interwork with an external electronic device (for example, the electronic device 104 or the server 106). Additional information on the information processing module 180 will be provided through FIGS. 2 to 25 below.

Figure 2:
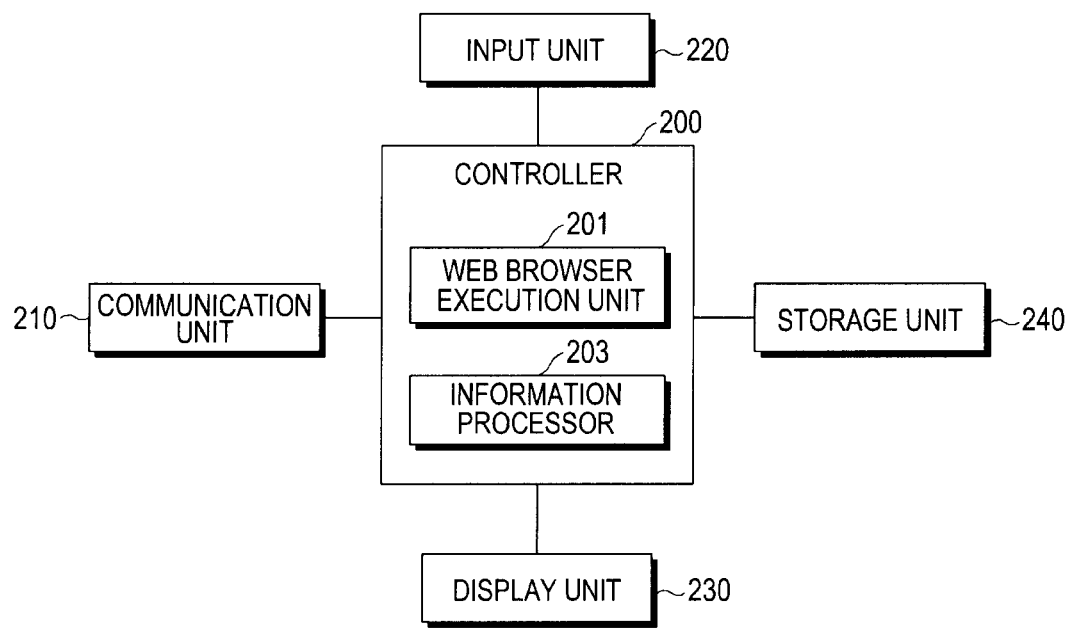
FIG. 2 illustrates a configuration example of an electronic device according to various embodiments of the present disclosure.

FIG. 2 is a block diagram illustrating the information processing module 180 of the electronic device (for example, the electronic device 101) according to various embodiments. For convenience of the description, an example in which the information processing module 180 is executed within the processor 120 will be described. Further, at least one element included in a controller 200 of FIG. 2 may be included in the information processing module 180 or the processor 120 of FIG. 1.

Referring to FIG. 2, according to various embodiments of the present disclosure, the electronic device may include at least one of the controller 200, a communication unit 210, an input unit 220, a display unit 230, and a storage unit 240. The controller 200 may include a web browser execution unit 201 and an information processor 203. Further, the controller 200 may have a configuration identical or similar to the configuration of the processor 120 illustrated in FIG. 1, and may further include another element for processing information as well as the web browser execution unit 201 and the information processor 203.

According to various embodiments, the web browser execution unit 201 may execute a web browser (for example, at least one of the programs such as Internet Explorer, Firefox, Chrome, and the like) and display a web document including information (for example, one or more contents) provided from at least one server located on the network. Further, the web browser execution unit 201 may display information related to a location which provides the web document in an address bar of the executed web browser.

The information related to the location which provides the web document according to various embodiments of the present disclosure may be a series of rules to accurately figure out a location and type of the corresponding information in order to find information which the user desires among vast information provided on the network. The information related to the location which provides the web document may be construed as, for example, address information of the web document, a Uniform Resource Locator (URL), a link, an internet site address, and/or a location of Internet information. In various embodiments of the present disclosure, the information related to the location which provides the web browser will be referred to as address information (for example, a URL) for convenience of the description. Further, the address information (for example, the URL) may include at least one of a protocol, the type (for example, information resource name) of particular information resources distributed on the network, a file directory, and location information (for example, an Internet domain name or an IP address), and may be applied to all types using computer network information resources such as email or file transmission.

According to various embodiments of the present disclosure, the web document may include at least one of various pieces of information on text, images, sound sources, thumbnails, and/or videos, and also include highlighted characters or images by which a connection to another document on the Internet can be made. According to various embodiments of the present disclosure, the web document may include of a Hyper Text Markup Language (HTML), an eXtensible Hypertext Markup Language (XHTML), Cascading Style Sheets (CSS), Javascript, an image, or a video such as Flash and may be transmitted or received through, for example, HTTP.

According to various embodiments of the present disclosure, when address information is selected in the web page displayed on the display unit 230, the information processor 203 may select one or more pieces of information (for example, one or more contents) among pieces of information included in the web document. Further, the information processor 203 may make a control to store or share the one or more pieces of selected information to be associated with the address information. According to various embodiments of the present disclosure, when the address information is selected, the information processor 203 may receive one or more contents related to the web document from the user.

According to various embodiments, when the address information is selected, the information processor 203 may search for one or more contents in the web document according to a preset condition, and automatically select the one or more found contents according to the preset condition or select one or more contents directly selected by the user. The one or more contents may include at least one of an image, text, a video, a thumbnail, and a sound source. According to various embodiments, the information processor 203 of the controller 200 may discover and select one or more contents to be stored in accordance with the address information according to the preset condition based on information (hereinafter, referred to as web configuration information) (for example, information related to a Document Object Model (DOM) and/or information related to a layout) contained in the web page included in a current display area and/or a hidden area of the web document. According to various embodiments, the controller 200 may make a control to display the web document through a browser and to generate a model within an HTML page of the DOM through the browser. The DOM may refer to a Javascript object including information of the web document (for example, HTML document) rendered within the browser, and may mean parsing the HTML document and storing the parsed HTML document in a tree form. The DOM may include header and body elements as a child node of the HTML element. Each child node (header and body) may include a plurality of elements.

According to various embodiments, when the displayed address information is selected by the user, the information processor 203 of the controller 200 may search for a plurality of elements included in a body element and select at least one piece of information (hereinafter, referred to first web configuration information) within the found element as contents to be stored with the selected address information. The information processor 203 of the controller 200 may store the selected first web configuration information along with the selected address information.

According to various embodiments, when the information processor 203 of the controller 200 collaborates with another electronic device in the web document, the information processor 203 may select at least one piece of the information displayed on the display 230 of the electronic device.

According to various embodiments, the information processor 203 of the controller 200 may select at least one object (hereinafter, referred to as second web configuration information) among the objects of the web document, that is, a layout displayed on a web execution screen as the contents to be stored along with the selected address information. The information processor 203 of the controller 200 may also store the selected second web configuration information along with the selected address information. According to various embodiments, the information processor 203 of the controller 200 may search for a corresponding element in the DOM by copying the second web configuration information (for example, capturing the screen) or using location information of the display area selected from the displayed web document, and extract information on the found element as the second web configuration information.

According to various embodiments, when address information is selected in a previous page and then address information is also selected in another page, the information processor 203 of the controller 200 may select one of the address information selected previously or in the previous page and the currently selected address information according to a configured address information selection condition. A detailed control operation for selecting one or more contents in the web document and a control operation for selecting the repeatedly of continuously selected address information will be described in more detail with reference to the figures described below. Further, the detailed control operation described with reference to the following figures may be performed by the controller 200 of the electronic device of FIG. 2. The copied address information and the one or more selected contents may be stored in a temporary storage space of the storage unit 240 (for example, a buffer) or a main storage space (for example, a memory card).

According to various embodiments, when a request for transmitting or pasting the copied address information is received, the information processor 203 may make a control to display the one or more contents along with the copied address information by reading the one or more contents stored in the main storage space and transmitting or pasting both the one or more contents and the copied address information.

Further, the information processor 203 may display one or more extracted contents on the display unit 230 and, when the user selects the one or more displayed contents, make a control to store or share the one or more selected contents to be associated with the copied address information.

In addition, according to various embodiments of the present disclosure, the controller 200 may further include an operation execution unit (not shown) that executes the operation of the electronic device. The operation execution unit may make a control to perform an operation in response to a user input or a detected input. According to various embodiments, the operation execution unit may control the display unit 230 to display an execution screen and information according to operation execution or control various operations of the electronic device (for example, at least one of vibration generation, sound output through a speaker, and an operation related to a camera module).

According to various embodiments of the present disclosure, at least some elements of the controller 200 may be included in the information processing module 180 illustrated in FIG. 1. According to various embodiments of the present disclosure, the controller 200 may be at least a part of the processor 120 illustrated in FIG. 1, and may include, for example, a combination of one or more of hardware, software, and firmware.

According to various embodiments of the present disclosure, at least some elements of the controller 200 may include, in hardware, at least some of at least one processor 120 including a Central Processing Unit (CPU)/Micro Processing Unit (MPU), the memory 130 (for example, a register and/or a Random Access Memory (RAM)) to which at least one piece of memory loading data is loaded, and the bus 110 for inputting/outputting at least one piece of data to the processor 120 and the memory 130. Further, the controller 200 may include, in software, a predetermined program routine or program data which is loaded to the memory 130 from a predetermined recording medium to perform a function defined in the electronic device and operation-processed by the processor 120.

According to various embodiments of the present disclosure, the communication unit 210 may perform communication between different electronic devices or servers through communication interfaces. Further, the communication unit 210 may transmit one or more contents selected in accordance with information related to a location, which provides a selected (for example, copied) web document, as well as the information. According to various embodiments, the communication unit 210 may be connected to a network by wireless or wired communication and perform communication through the communication interface. The wireless communication may include at least one of, for example, Wi-Fi, Bluetooth (BT), Near Field Communication (NFC), Global Positioning System (GPS) and cellular communication (for example, at least one of LTE, LTE-A, CDMA, WCDMA, UMTS, WiBro, GSM and the like). The wired communication may include at least one of, for example, a Universal Serial Bus (USB), a High Definition Multimedia Interface (HDMI), Recommended Standard 232 (RS-232), and a Plain Old Telephone Service (POTS). The communication unit 210 may include all types of communication schemes which have been widely known or will be developed in the future as well as the aforementioned communication schemes.

According to various embodiments of the present disclosure, the input unit 220 may transmit, to the controller 200, various pieces of information such as number and character information input from the user, various function settings, and signals which are input in connection with a control of functions of the electronic device. Further, the input unit 220 may support a user input for executing an application that supports a particular function. The input unit 220 may include at least one of a key input means such as a keyboard or a keypad, a touch input means such as a touch sensor or a touch pad, a voice input means, various sensors, and a camera, and further include a gesture input means. In addition, the input unit 220 may include all types of input means which are being developed currently or will be developed in the future.

According to various embodiments, the input unit 220 may receive at least one piece of information input by the user through a touch panel of the display unit 230, for example, a request for copying address information, a selection of one or more contents, and/or information on a request for transmitting or pasting copied address information, and transfer at least one piece of the input information to the controller 200.

According to various embodiments of the present disclosure, the input unit 220 may correspond to the input/output interface 150 of FIG. 1.

According to various embodiments, the display unit 230 may display operation execution information and operation execution result information according to an operation control by an operation execution unit (not shown). The display unit 230 may display an executable application list or an execution result of the set application.

According to various embodiments, the display unit 230 may execute a web browser according to a control of the web browser execution unit 201 and display a web document in the executed web browser. When address information of the currently displayed web document is selected according to a configured operation, the display unit 230 may display a selection menu including at least one of copying the address information, copying the address information along with contents, cutting the address information, pasting the address information and/or sharing the address information.

Further, the display unit 230 may display one or more contents, which are automatically selected according to the selection of the address information or directly selected in the web document or input by the user.

According to various embodiments of the present disclosure, the display unit 230 may correspond to the display module 160 of FIG. 1. According to various embodiments of the present disclosure, when the display module 160 of the electronic device 101 of FIG. 1 is implemented in a touch screen form, the input unit 220 and/or the display unit 230 may correspond to the touch screen. When the display unit 230 is implemented in the touch screen form together with the input unit 220, the display unit 230 may display various pieces of information generated according to a user's touch action.

According to various embodiments, the display unit 230 may be configured by one or more of a Liquid Crystal Display (LCD), a Thin Film transistor LCD (TFT-LCD), an Organic Light Emitting Diode (OLED), LED, Active Matrix OLED (AMOLED), a flexible display, and a 3 dimensional display. Some of the displays may be implemented in a transparent type or a light transmission type so that the outside can be seen therethrough. The display may be implemented in a transparent display form including Transparent OLED (TOLED).

According to various embodiments, the storage unit 240 may temporarily store various pieces of data generated during execution of a program including a program utilized for an operation of a function according to various embodiments. The storage unit 240 may largely include a program area and a data area. The program area may store pieces of information related to driving of the electronic device such as an Operating System (OS) that boots the electronic device. The data area may store transmitted or received data or generated data according to various embodiments.

The storage unit 240 may store address information selected in the web document displayed on the display unit 230 and store one or more contents selected according to the selection of the address information to be associated with the address information.

The storage unit 240 may include a temporary storage space (for example, a buffer) and a main storage space (for example, a memory card), and may temporarily store the selected address information or one or more contents corresponding to the selected address information in the temporary storage space. Further, the storage unit 240 may store the selected address information in the temporary storage space and store the one or more selected contents in the main storage space. When there is a request for at least one of pasting or transmitting the information stored in the temporary storage space, the storage unit 240 may read the information stored in the temporary storage space and then delete the stored information corresponding to the read information from the temporary storage space. Further, the storage unit 240 may keep the information stored in the main storage space until the execution of the web browser is stopped or for a preset period.

According to various embodiments of the present disclosure, the storage unit 240 may correspond to the memory 130 of FIG. 1. The storage unit 240 may include at least one storage medium of a flash memory, a hard disk, a multimedia card micro type memory (for example, an SD or XD memory), a RAM, and a ROM.

The main elements of the electronic device have been described through the electronic device of FIG. 2 (for example, the information processing module 180 of the electronic device 101). However, not all the elements included in FIG. 2 are necessary elements, and the electronic device (for example, the information processing module 180 of the electronic device 101) may be implemented by more elements than the elements illustrated in FIG. 2 or fewer elements than the elements illustrated in FIG. 2. For example, the electronic device (for example, the information processing module 180 of the electronic device 101) may further include a sound source output unit (not shown) that converts a sound source, which is an electrical signal, into an analog signal and outputs the analog signal.

Further, locations of the main elements of the electronic device (for example, the information processing module 180 of the electronic device 101) illustrated in FIG. 2 may be changed according to various embodiments. In addition, the elements included in the controller 200 are not limited to the elements illustrated in FIG. 2, and the controller 200 may include various elements that perform various functions.

An electronic device according to one of the various embodiments of the present disclosure may include a display unit that displays a web document; and a processor operatively coupled to memory, may configured to, in response to detecting selection of information (for example, the information) related to a web-based location of the displayed web document, select one or more contents included in the web document, and store in the memory the selected one or more contents in association with the address information of the displayed web document.

According to various embodiments of the present disclosure, the processor may make a control to display or transmit the one or more contents along with the address information of the displayed web document.

According to various embodiments of the present disclosure, the one or more selected contents may include at least one of an image, a dynamic image, a video, text, a thumbnail image, and a sound source included the displayed web document.

According to various embodiments of the present disclosure, the processor may automatically select one or more contents from a plurality of contents included in the web document in accordance with the selection of the address information of the displayed web document.

According to various embodiments of the present disclosure, the processor may make a control to receive, from a user, an identification on whether to store the one or more selected contents to be associated with the information related to the location, which provides the web document.

According to various embodiments of the present disclosure, when the one or more selected contents are not stored to be associated with the address information of the displayed web document, the processor may make a control to re-select one or more contents from the plurality of contents included in the displayed web document according to the preset condition.

According to various embodiments of the present disclosure, the processor may select the one or more contents in a current display area of the displayed web document according to a priority of a preset condition and, when the current display area lacks any content to be selected, select the one or more contents from a previously displayed area of the displayed web document according to the priority of the preset condition.

According to various embodiments of the present disclosure, the processor may make a control to display one or more contents found automatically in the displayed web document according to a preset condition and to select the one or more displayed contents according to a user's request in accordance with the selection of the address information of the displayed web document.

According to various embodiments of the present disclosure, the processor may make a control to select contents, which a user directly selects from the displayed web document, as the one or more contents in accordance with the selection of the address information of the displayed web document.

According to various embodiments of the present disclosure, when the displayed web document includes a dynamic image or a video, the processor may make a control to detect selection of a playback position within the dynamic image or the video and capture an image of the dynamic image or the video at selected playback position as the selected one or more contents.

According to various embodiments of the present disclosure, the processor may make a control to display or transmit the one or more contents stored in association with the address information with input information received via a user input related to the displayed web document.

According to various embodiments of the present disclosure, the processor may make a control to display the address information of the web document, along with one or more contents, which have been previously received or pasted, and to select the one or more displayed contents as the one or more contents stored to be associated with the information related to the location, which provides the displayed web document.

According to various embodiments of the present disclosure, the processor may make a control to select the one or more contents according to a preset condition based on at least one piece of Document Object Model (DOM)-related information and layout-related information in accordance with the selection of the address information of the displayed web document.

Hereinafter, a method of processing information in an electronic device according to various embodiments of the present disclosure will be described in detail with reference to the accompanying drawings.

Figure 3:
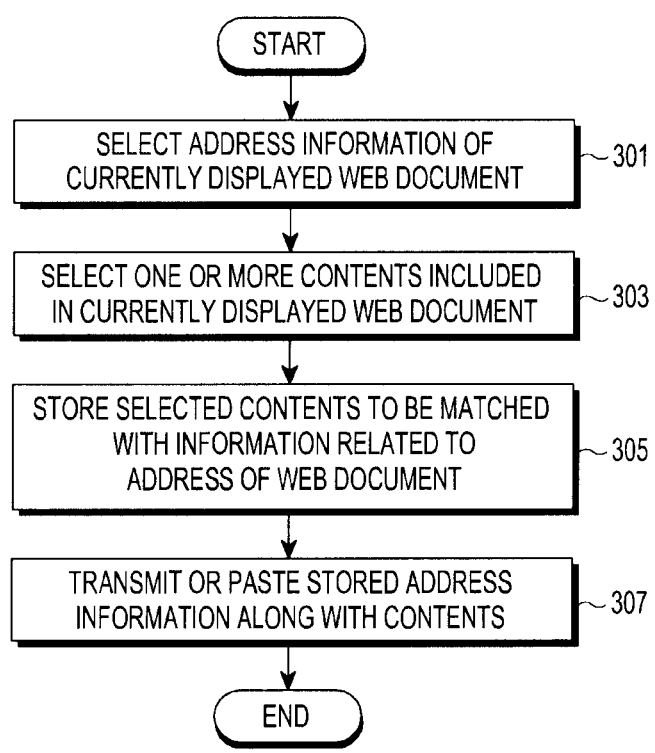
FIG. 3 illustrates an operation process of an electronic device according to various embodiments of the present disclosure.

FIG. 3 illustrates an operation process of the electronic device according to various embodiments of the present disclosure.

Referring to FIG. 3, according to various embodiments of the present disclosure, the electronic device may execute a web browser according to a request for executing a web and display a web document in the executed web browser. In operation 301, the electronic device may display information related to a web location which provides the currently displayed web document (for example, a URL, or otherwise "address information") in an address bar of the web browser, and select the address information (using, for example, at least one of copying, cutting, capturing, and sharing functions) displayed in the address bar according to a request of the user. According to various embodiments, the address information may be included within the web document rather than the address bar. Similarly, the electronic device may select the address information included within the web document.

In operation 303, the electronic device may select one or more contents included in the currently displayed web document. The one or more contents may include at least one of an image, text, a video, a thumbnail, and a sound source. According to various embodiments, the electronic device may search for one or more contents in the web document according to a condition preset for the search, and automatically select the one or more found contents according to the preset condition or select one or more contents directly selected by the user. According to various embodiments of the present disclosure, the electronic device may receive one or more contents related to the web document from the user. A detailed control operation for selecting the one or more contents in the web document will be described in more detail with reference to the figures below.

In operation 305, the electronic device may store the one or more selected contents to be associated with address information. The selected address information and the one or more selected contents may be temporarily stored in a temporary storage space of the storage unit 240 (for example, a buffer) or may be stored in a main storage space (for example, a memory card). Further, the copied address information may be temporarily stored, and the one or more selected contents may be stored in the main storage space. When there is a request for at least one of the paste and the transmission, the information stored in the temporary storage space may be read and then deleted from the temporary storage space. Further, the information stored in the main storage space may be kept until the execution of the web browser is stopped or for a preset period.

According to various embodiments, in operation 307, the electronic device may display or transmit the one or more contents stored to be associated with the address information along with information related to the address information, according to a request for pasting or sharing the address information. Further, according to various embodiments, when the electronic device selects address information in the previously displayed web document on the web browser and then again selects the address information in the currently displayed document, the electronic device may select one piece of a plurality of address information selected according to a preset condition for selection of the address information. According to various embodiments, the electronic device may sequentially or simultaneously paste or transmit the plurality of stored address information. The selected address information may be stored to be associated with the selected contents, respectively. Further, the previously selected address information may be stored with the currently selected address information in the temporary storage space without being deleted even though the current address information is selected until the execution of the web browser stops or for a preset period. According to various embodiments, when the current address information is selected, the previously selected address information may be stored in the main storage space without being deleted, and the currently selected address information may be stored in the temporary storage space. According to various embodiments, when there are no contents stored with the previously selected address information, the information processor 203 may delete the previously selected address information from the temporary storage space or the main storage space.

A method of processing information in an electronic device according to one of various embodiments of the present disclosure may include an operation of displaying a web document, in response to detecting selection of information (for example, address information) related to a web-based location of the displayed web document, selecting one or more contents included in the displayed web document, and storing the selected one or more contents in associating with the address information of the displayed web document.

The method of processing information in the electronic device according to one of various embodiments of the present disclosure may further include an operation of displaying the one or more contents along with the address information of the displayed web document.

The method of processing information in the electronic device according to one of various embodiments of the present disclosure may further include an operation of transmitting the one or more contents along with the address information of the displayed web document.

According to various embodiments of the present disclosure, the one or more selected contents may include at least one of an image, a dynamic image, a video, text, a thumbnail image, and a sound source.

According to various embodiments of the present disclosure, the operation of selecting of the one or more contents included in the displayed web document may include: an operation of searching for contents included in the displayed web document; and automatically selecting one or more contents from a plurality of found contents according to a preset condition.

According to various embodiments of the present disclosure, the operation of selecting of the one or more contents included in the web document may further include an operation of receiving, from a user, an identification on whether to store the one or more selected contents to be associated with the address information of the displayed web document.

According to various embodiments of the present disclosure, the operation of selecting of the one or more contents included in the displayed web document may further include an operation of, when the one or more selected contents are not stored to be associated with the address information of the displayed web document, re-selecting one or more contents from the plurality of contents included in the displayed web document according to the preset condition.

According to various embodiments of the present disclosure, the operation of selecting of the one or more contents included in the displayed web document may include: an operation of identifying whether there are contents to be selected in a current display area, and an operation of, when there are the contents to be selected, selecting one or more contents in the current display area of the web document according to a priority of a preset condition.

According to various embodiments of the present disclosure, the operation of selecting of the one or more contents included in the web document may further include, when there are no contents to be selected in the current display area, an operation of selecting one or more contents in a previous displayed area of the displayed web document according to the priority of the preset condition.

According to various embodiments of the present disclosure, the operation of selecting of the one or more contents included in the displayed web document may include an operation of displaying one or more contents found in the displayed web document according to a preset condition and an operation of selecting the one or more displayed contents according to a user's request.

According to various embodiments of the present disclosure, the operation of selecting of the one or more contents included in the displayed web document may include an operation of identifying one or more contents selected from the displayed web document by a user and an operation of selecting the one or more identified contents.

According to various embodiments of the present disclosure, the operation of selecting of the one or more contents included in the displayed web document may include when the displayed web document includes a dynamic image or a video, detecting selection of a playback position within the dynamic image or the video and capturing an image of the dynamic image or video at the selected playback position as the selected one or more contents.

According to various embodiments of the present disclosure, the operation of selecting of the one or more contents included in the displayed web document may include an operation of displaying the address information of the web document, along with one or more contents, which have been previously received or pasted and an operation of making a control to select the one or more displayed contents as the one or more contents stored to be associated with the address information of the displayed web document.

According to various embodiments of the present disclosure, the operation of selecting of the one or more contents included in the displayed web document may include an operation of selecting the one or more contents according to a condition set based on at least one piece of Document Object Model (DOM)-related information and layout-related information in accordance with the selection of the address information of the displayed web document.

The method of processing information in the electronic device according to one of various embodiments of the present disclosure may further include an operation of displaying or transmitting the one or more pieces of information received from the user, along with the one or more contents stored to be associated with the information related to the location, which provides the web document, and the address information of the web document.

Thereafter, an operation for processing information in an electronic device according to various embodiments of the present disclosure will be described in more detail.

Figure 4:
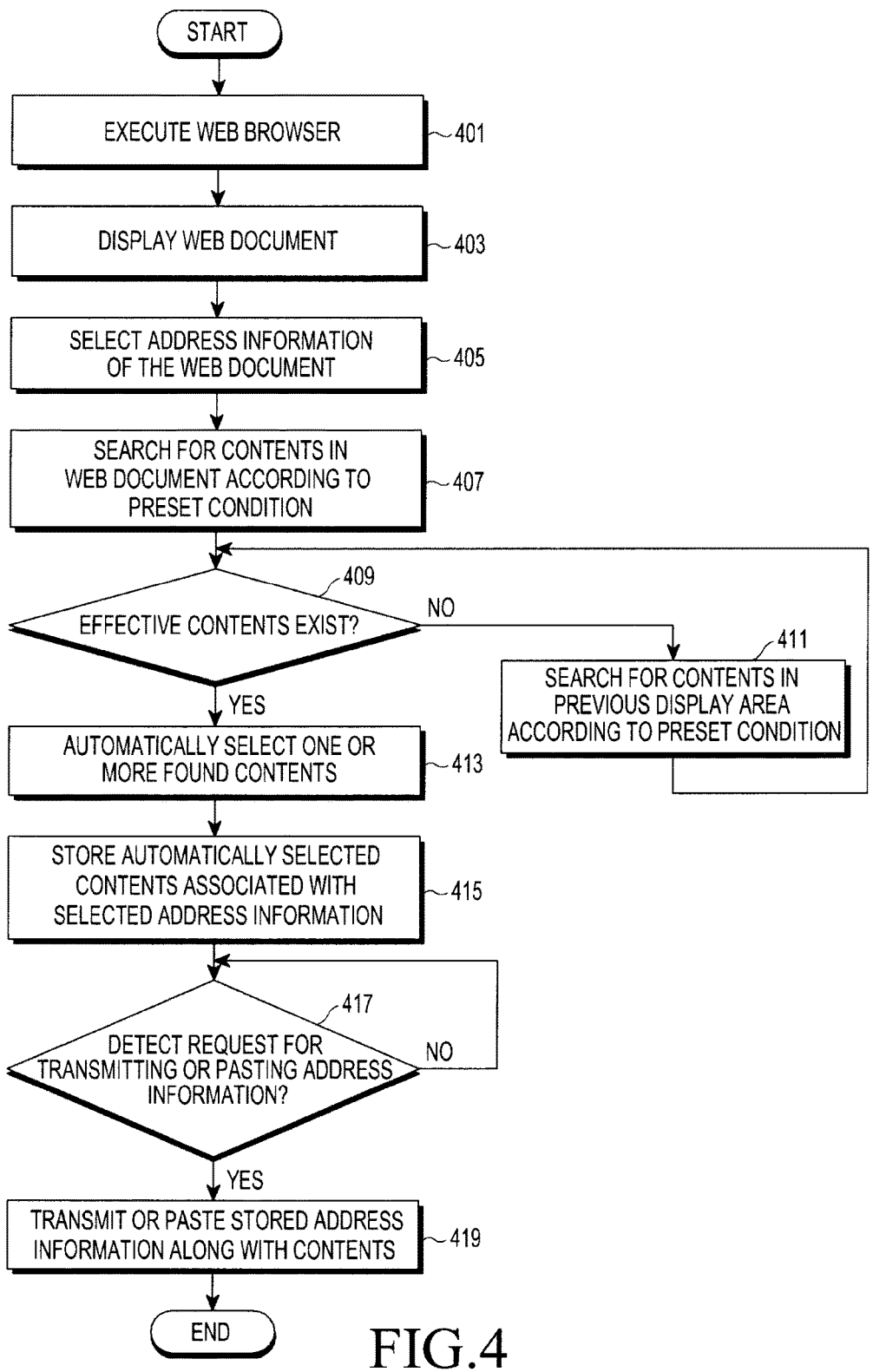
FIG. 4 illustrates an operation process of an electronic device according to various embodiments of the present disclosure.
Figure 5:
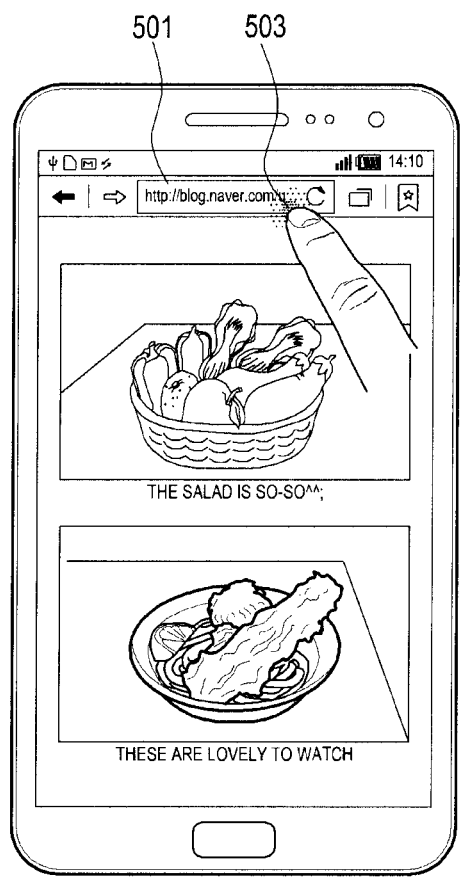
FIG. 5 illustrates a web document displayed in an electronic device according to various embodiments of the present disclosure.
Figure 6:
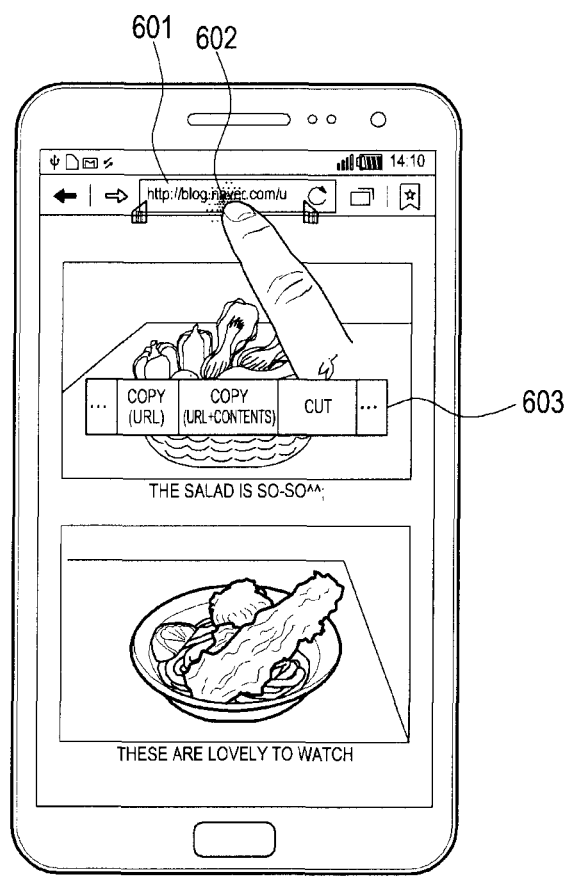
FIG. 6 illustrates a screen example for copying address information in a web document displayed on an electronic device according to various embodiments of the present disclosure.
Figure 7:
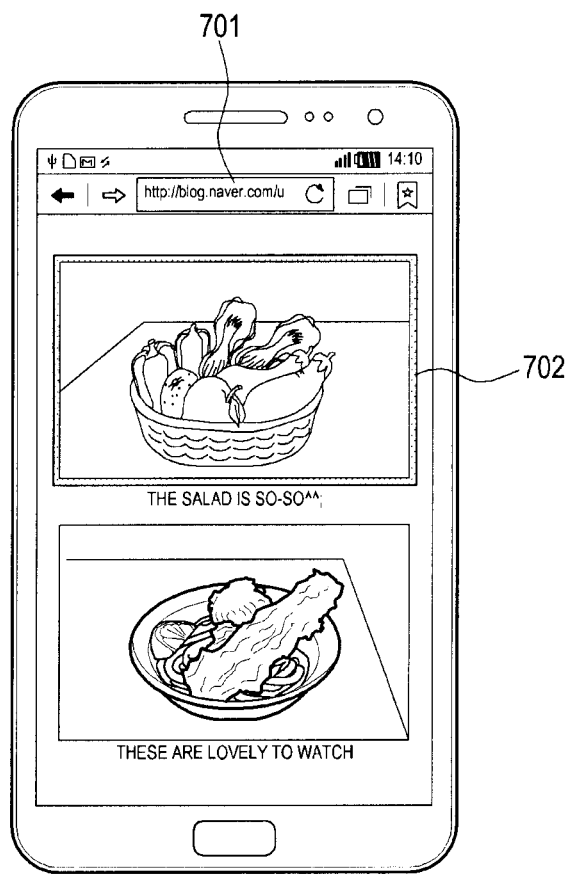
FIG. 7 illustrates a screen example for showing contents selected in a web document displayed in an electronic device according to various embodiments of the present disclosure.
Figure 8:
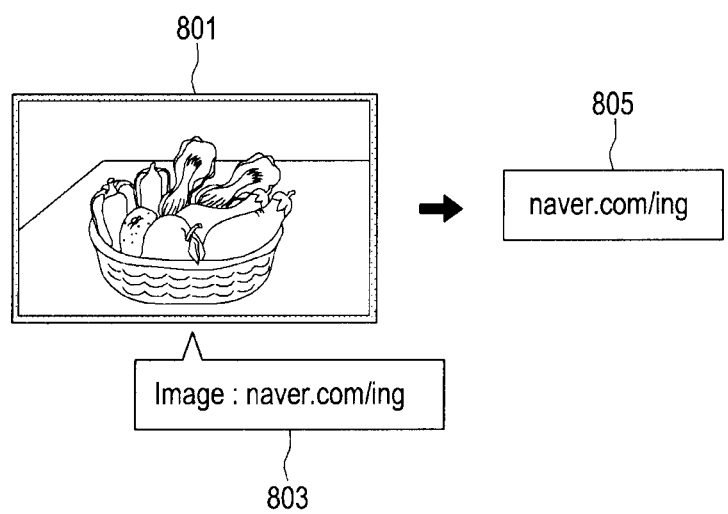
FIG. 8 illustrates a screen example for storing selected contents to be associated with copied address information in an electronic device according to various embodiments of the present disclosure.
Figure 9:
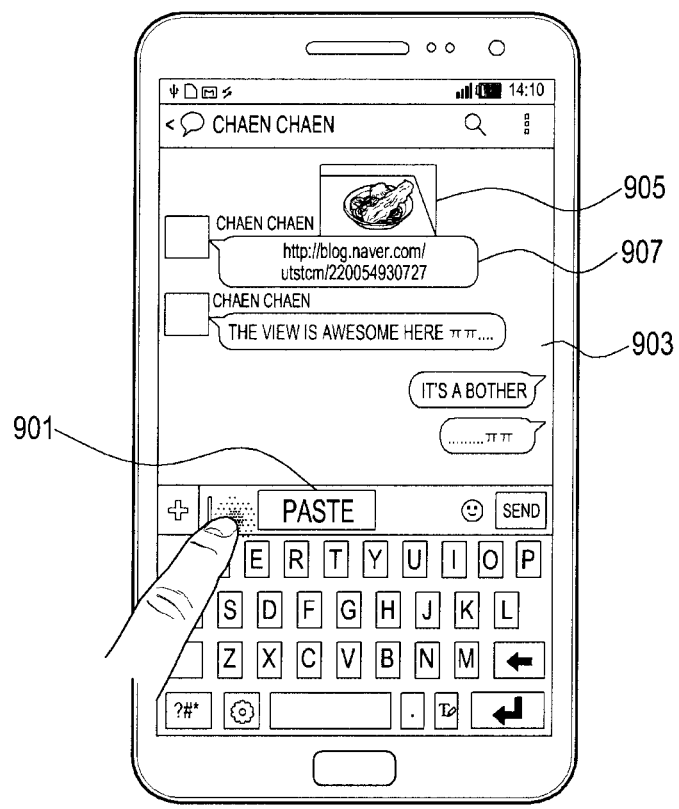
FIG. 9 illustrates a screen example for sharing copied address information in an electronic device according to various embodiments of the present disclosure.
Figure 10:
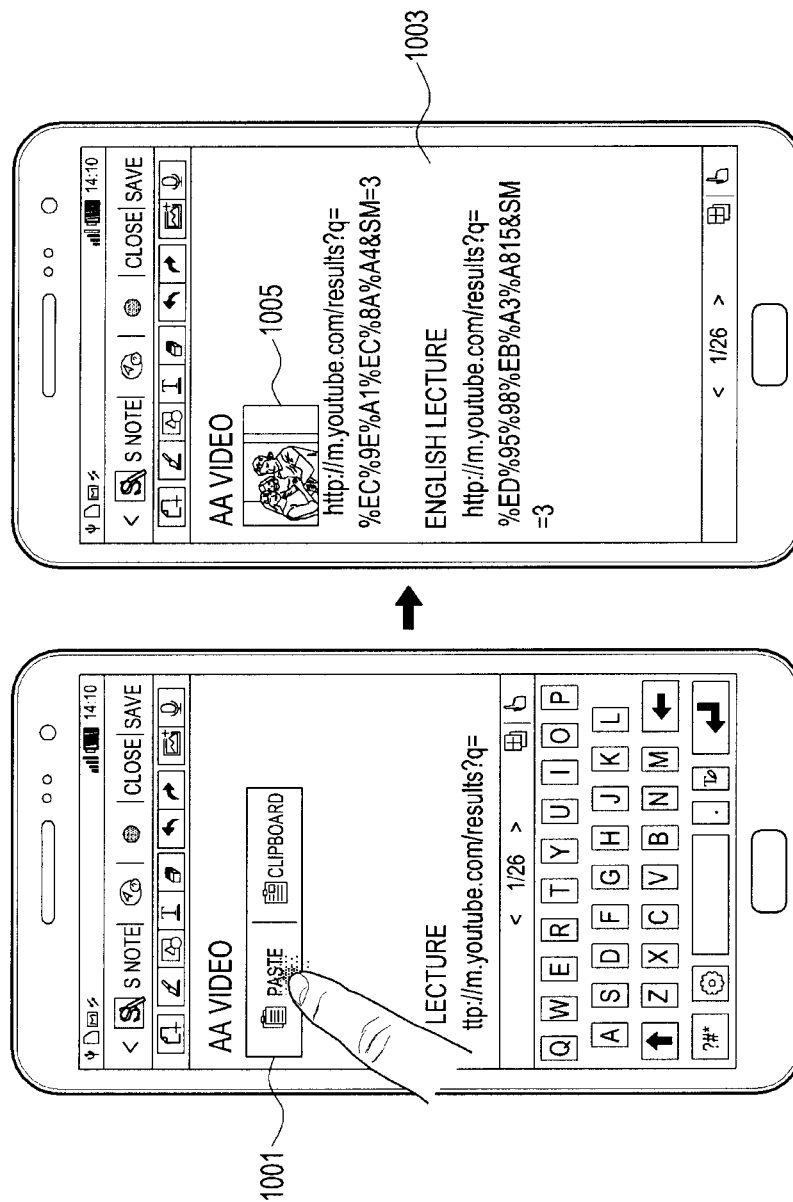
FIG. 10A and FIG. 10B illustrate a screen example for pasting copied address information to an edited document in the electronic device according to various embodiments of the present disclosure.

FIG. 4 illustrates an operation process of the electronic device according to various embodiments of the present disclosure. FIG. 5 illustrates a web document displayed in the electronic device according to various embodiments of the present disclosure. FIG. 6 illustrates a screen example for copying address information in a web document displayed on the electronic device according to various embodiments of the present disclosure. FIG. 7 illustrates a screen example for showing contents selected in a web document displayed on the electronic device according to various embodiments of the present disclosure. FIG. 8 illustrates a screen example for storing selected contents to be associated with copied address information in an electronic device according to various embodiments of the present disclosure. FIG. 9 illustrates a screen example for sharing copied address information in the electronic device according to various embodiments of the present disclosure. FIGS. 10A and 10B illustrates a screen example for pasting copied address information to an edited document in the electronic device according to various embodiments of the present disclosure.

Referring to FIGS. 4, 5, 6, 7, 8, 9, 10A and 10B, according to various embodiments of the present disclosure, the electronic device may execute a web browser according to a web execution request in operation 401.

In operation 403, the electronic device may display a web document in an executed web browser, as illustrated in FIG. 5 including display information 501 (for example, a URL, hereinafter, referred to as address information) indicating a web address for the currently displayed web document in an address bar of the web browser.

In operation 405, the electronic device may select the address information 501 (for example, at least one of copying, cutting, capturing, and sharing functions) displayed in the address bar according to a request of the user, as illustrated via reference numeral 503 in FIG. 5. Referring now to FIG. 6, according to various embodiments, when the user selects address information 601 from the address bar according to a preset operation (for example, at least one of a long press, a drag on a corresponding area, and a double touch) as indicated by reference numeral 602, the electronic device may display a selection menu 603 including at least one function for copying the address information, copying the address information along with contents (e.g., "URL+ Contents"), cutting the address information, pasting the address information and/or sharing (or transmitting) the address information.

In operation 407, the electronic device may search for content according to a condition preset for selecting one or more contents in the web document. According to various embodiments, the electronic device may search for and select one or more contents to be stored to be associated with the address information according to a preset condition based on web configuration information (for example, DOM-related information and/or layout-related information) included in a currently displayed area and/or a hidden area of the web document. Further, according to various embodiments, the electronic device may configure a condition for selecting the contents such that the one or more contents are preferentially selected from images included in the currently displayed area, text of a specific mark, dynamic images, or information preset by the user. Various embodiments for searching for and selecting the one or more contents may be applied in the same way as that of the various embodiments of FIG. 2. The condition for selecting the one or more contents will be described in detail with reference to the figures below.

In operation 409, the electronic device may identify whether "effective" contents, (that is, contents matching or satisfying the condition) to be selected exist. When the effective contents do not exist based on a result of the identification, the electronic device may search for contents in a previous display area (and/or previous scroll area) of the corresponding web document according to the preset condition in operation 411.

In contrast, when the effective contents exist, the electronic device may automatically select the one or more found contents according to a priority of the preset condition in operation 413. For example, according to various embodiments, the electronic device may automatically select at least one of a largest image, an image located at the center, an image having a specific mark, and a most frequently clicked image among the images included in the current display area. According to various embodiments, when there is no image in the web document, the electronic device may analyze text in the web document and may automatically select or automatically select, according to a priority, at least one of text recognized as a title, text having a specific mark, text, which has been copied, and most frequently clicked text. According to various embodiments, the electronic device may combine at least two of an image, a still from a dynamic image, a thumbnail, text, and a sound source to configure a priority for selecting one or more contents. As illustrated in FIG. 7, the electronic device may display a specific mark (for example, highlight) 702 on the one or more selected contents in the web document. According to various embodiments, when a dynamic image included in the web document is selected, the electronic device may select at least one of entire frames of the dynamic image, some frames (for example, some still images), and a dynamic image selected by the user. According to various embodiments, the electronic device may automatically select a first image of the dynamic image, capture a dynamic image, which is reproduced at a time point when the address information 701 is selected, read the corresponding frame, or convert frame in some sections into an image (or thumbnail) file to automatically select the dynamic image.

In operation 415, the electronic device may store the automatically selected contents and the selected address information and associate the two with each other. Referring now to FIG. 8, according to various embodiments, the electronic device may analyze tag information 803 (for example, image: naver.com/ing) of one or more selected contents (for example, an image 801), generate a pattern 805 (for example, naver.com/ing as mapping information) for storing the contents to be associated with the address information, and store the address information and the one or more selected contents in association with each other by using the generated pattern 805 as illustrated in FIG. 8.

In operation 417, the electronic device may identify whether there is a request for pasting or sharing (or transmitting) the address information. When there is no request for pasting or sharing (or transmitting) the address information based on a result of the identification, the electronic device may continue to perform operation 417.

When the request for pasting or sharing (or transmitting) the address information is received based on a result of the identification, the electronic device may display the address information along with the one or more contents, which are stored to be associated with the address information or transmit the address information and the one or more contents to another electronic device. Referring now to FIG. 9, according to various embodiments, address information selected through a messenger service is pasted to a message input window as indicated by reference numeral 901 and then transmitted, the electronic device may transmit one or more selected contents (for example, an image) 905 along with address information 907 and simultaneously display the address information 907 and the one or more selected contents (for example, the image) 905 in a message window 903. Referring now to FIGS. 10A and 10B, according to various embodiments, when an application having a memo or edit function is executed and a paste 1001 is performed, the electronic device may simultaneously display address information 1003 and one or more selected contents (for example, an image) 1005 on an execution screen.

Figure 11:
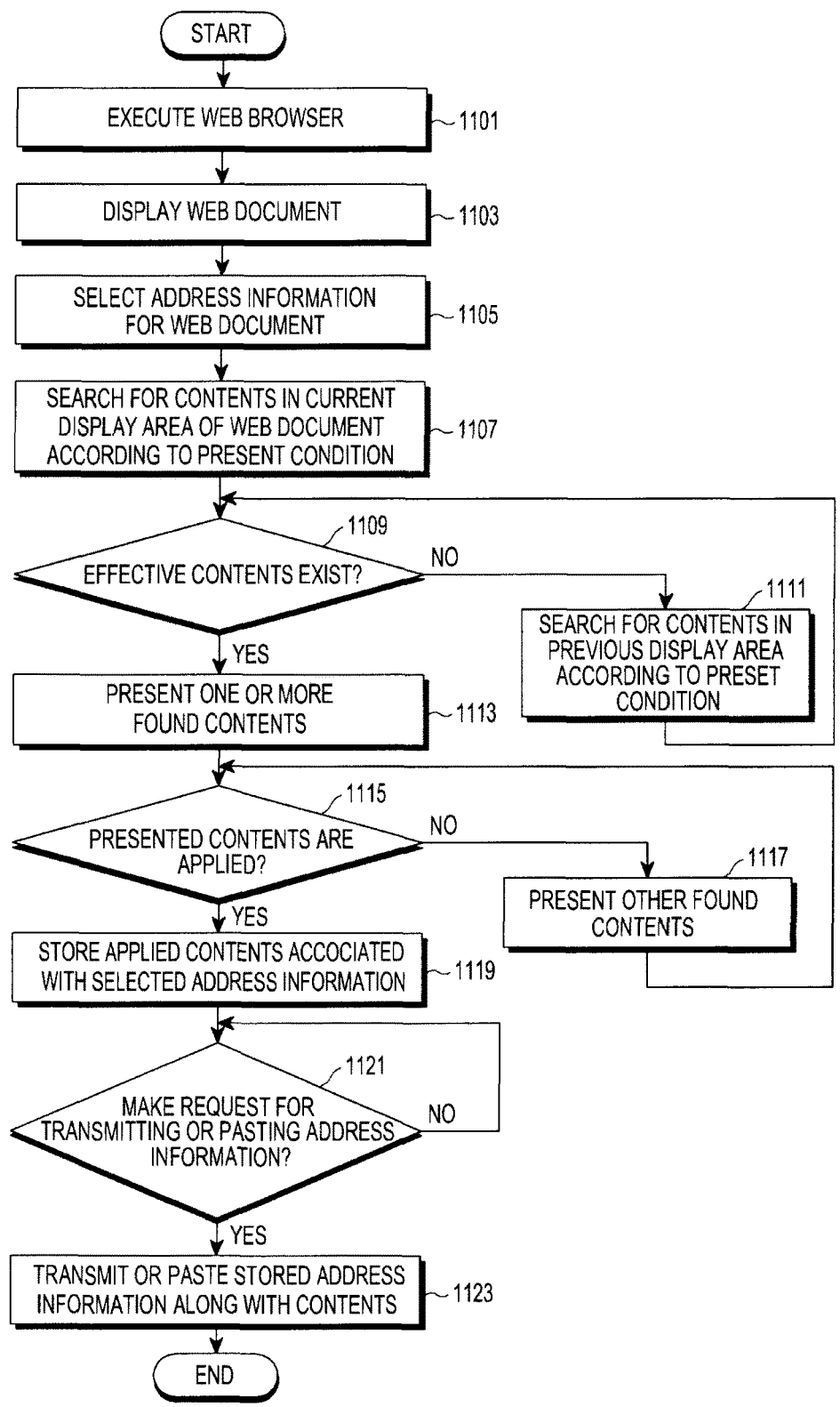
FIG. 11 illustrates an operation process of an electronic device according to various embodiments of the present disclosure.

FIG. 11 illustrates an operation process of the electronic device according to various embodiments of the present disclosure. FIGS. 12, 13, 14, and 15 illustrate screen examples for selecting contents in a web document displayed on the electronic device according to various embodiments of the present disclosure.

Referring to FIGS. 11, 12, 13, 14, and 15, according to various embodiments of the present disclosure, the electronic device may execute a web browser according to a web execution request in operation 1101.

In operation 1103, the electronic device may display a web document in the executed web browser, and display address information (for example, a URL) for the web document in an address bar of the web browser or an area of the web document.

In operation 1105, the electronic device may select (for example, by at least one of the functions for copying, cutting, capturing, or sharing) the address information displayed in the address bar or the area of the web document according to a request of the user.

In operation 1107, the electronic device may search for contents in a current display area of the currently displayed web document according to a preset condition. According to various embodiments, contents included in the current display area may be searched for according to a priority of the preset condition. For example, when an image is configured to have a highest priority to be searched for, the electronic device may preferentially search for the image. According to various embodiments, the electronic device may search for and select one or more contents to be stored to be associated with the address information according to a preset condition based on web configuration information (for example, DOM-related information and/or layout-related information) included in a currently displayed area and/or a hidden area of the web document. Further, according to various embodiments, the electronic device may configure a condition for selecting the contents such that the one or more contents are preferentially selected from images included in the currently displayed area, text of a specific mark, dynamic images, or information preset by the user. Various embodiments for searching for and selecting the one or more contents may be applied in the same way as that of the various embodiments of FIG. 2. The condition for selecting the one or more contents will be described in detail with reference to the figures below.

In operation 1109, the electronic device may identify whether effective contents, (that is, contents to be selected matching or fulfilling the preset condition) exist. When the effective contents do not exist based on a result of the identification, the electronic device may search for contents in a previous display area (such as a previous scroll area) of the corresponding web document according to the preset condition in operation 1111.

Figure 12:
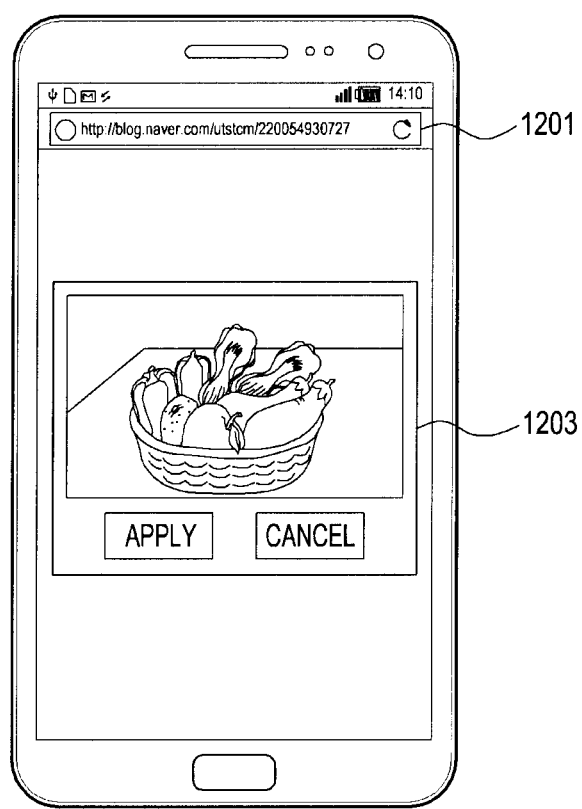
FIG. 12 illustrates a screen example for selecting contents in a web document displayed in an electronic device according to various embodiments of the present disclosure.
Figure 14:
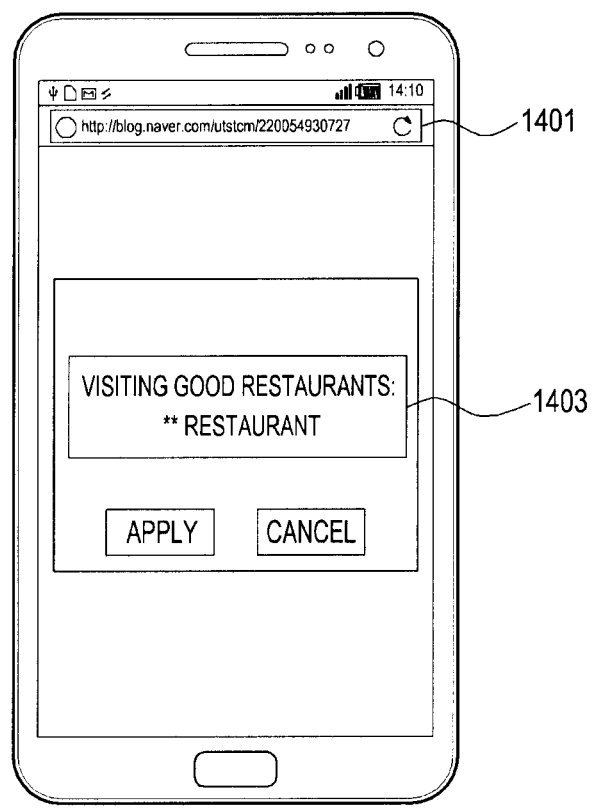
FIG. 14 illustrates a screen example for selecting contents in a web document displayed in an electronic device according to various embodiments of the present disclosure.
Figure 15:
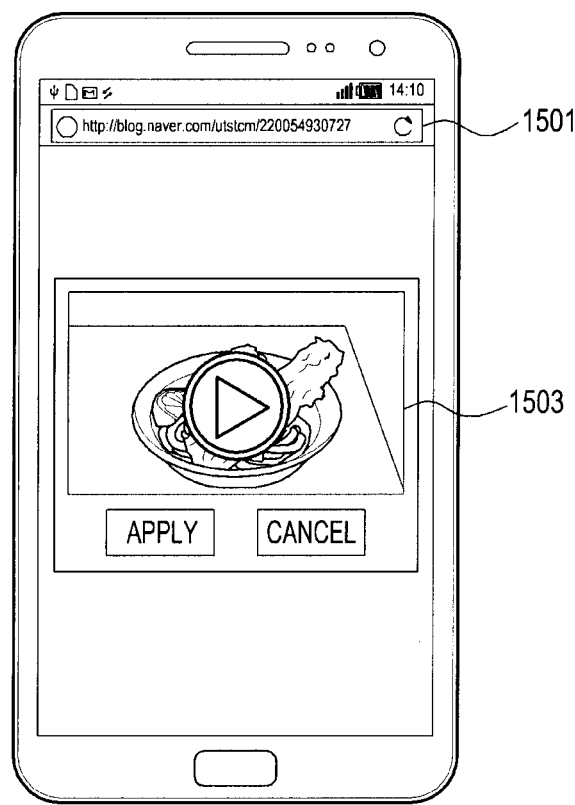
FIG. 15 illustrates a screen example for selecting contents in a web document displayed in an electronic device according to various embodiments of the present disclosure.

In contrast, when the effective contents exist, the electronic device may display a screen for presenting the one or more found contents (for example, display the contents through a popup window on the screen displaying the web document or overlap the contents with the screen displaying the web document) in operation 1113. Referring now to FIG. 12, according to various embodiments, when address information 1201 is copied, the electronic device may display a content presenting screen 1203 for identifying the application of the selected image after performance of the above-described operations. Referring to FIG. 14, according to various embodiments, when address information 1401 is copied, the electronic device may display a content presenting screen 1403 for identifying the application of the selected text (such as, for example, "visiting good restaurants:  restaurant") after performance of the operations. Referring to FIG. 15, according to various embodiments, when address information 1501 is copied, the electronic device may display a content presenting screen 1503** for identifying the application of the selected dynamic image after performance of the operations.

Figure 13:
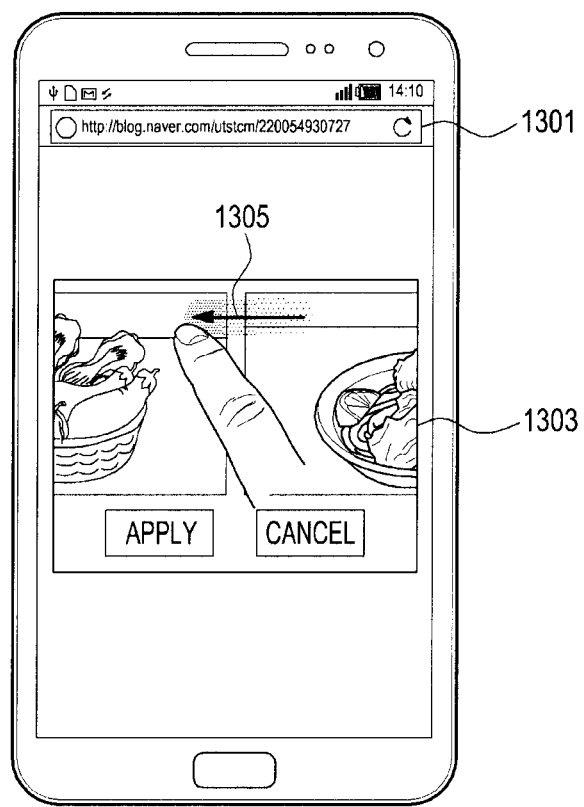
FIG. 13 illustrates a screen example for selecting contents in a web document displayed in an electronic device according to various embodiments of the present disclosure.

In operation 1115, the electronic device may identify whether to apply the presented contents. When the presented contents are not applied based on a result of the identification, the electronic device may display other found or discovered contents in operation 1117, or return to operation 1107 to re-perform the described operations. Referring to FIG. 13, according to various embodiments, address information 1301 may be selected in accordance with a user input. Further, as the user performs a movement operation 1305 (such as a swipe operation) on the presented contents in a content presenting screen 1303, the electronic device may switch display the content presenting screen 1303 other found or identified contents. The user may view a plurality of found contents in the web document through repetitions of the swipe operation 1305 and select one or more contents from the displayed plurality of contents.

When the presented contents are applied based on a result of the identification, the electronic device may store the applied contents to be associated with the selected address information in operation 1119.

In operation 1121, the electronic device may identify whether there is a request for pasting or sharing the address information. When there is no request for pasting or sharing the address information based on a result of the identification, the electronic device may continue to perform operation 1121.

When the request for pasting or sharing (or transmitting) the address information is received based on a result of the identification, the electronic device may display the address information along with the one or more contents, which are stored in associated with the address information, or transmit the address information and the associated contents to another electronic device in operation 1123.

Figure 16:
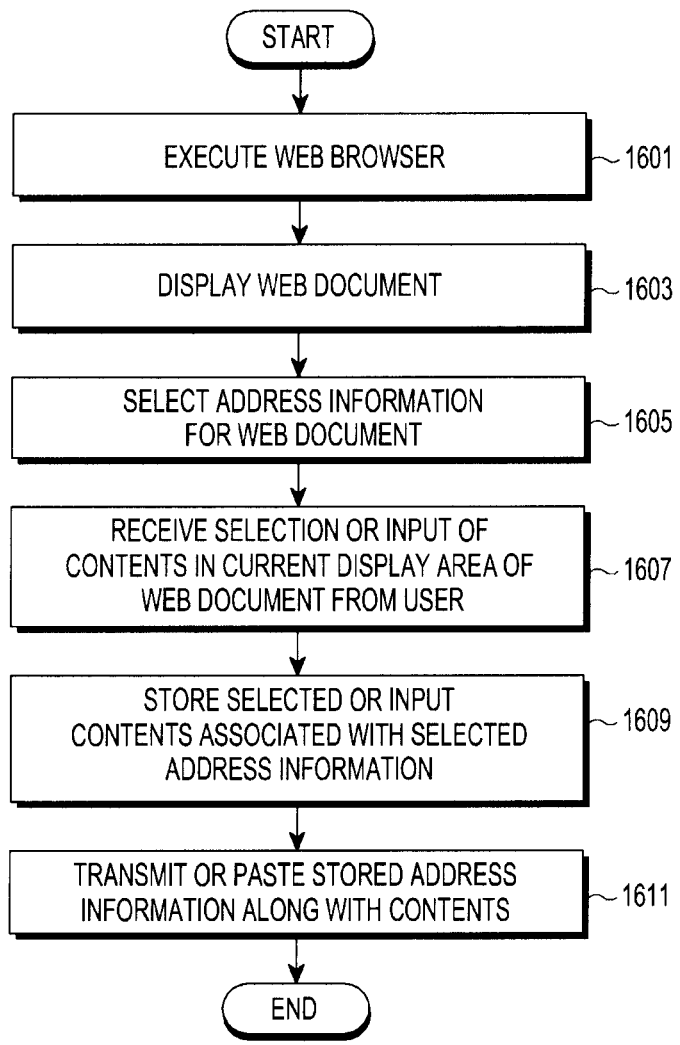
FIG. 16 illustrates an operation process of an electronic device according to various embodiments of the present disclosure.
Figures 17A, 17B:
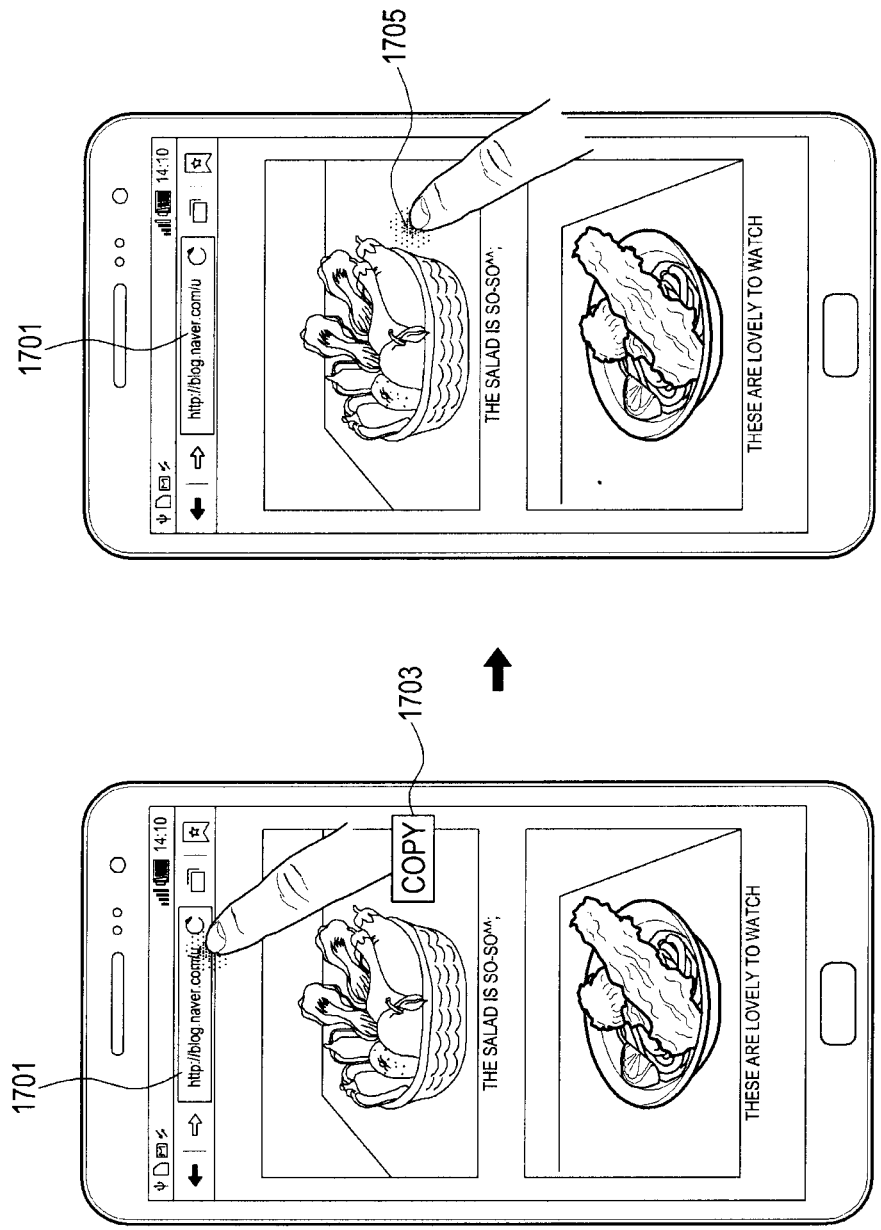
FIG. 17A and FIG. 17B illustrate a screen example for selecting contents in a web document displayed in an electronic device according to various embodiments of the present disclosure.
Figure 18:
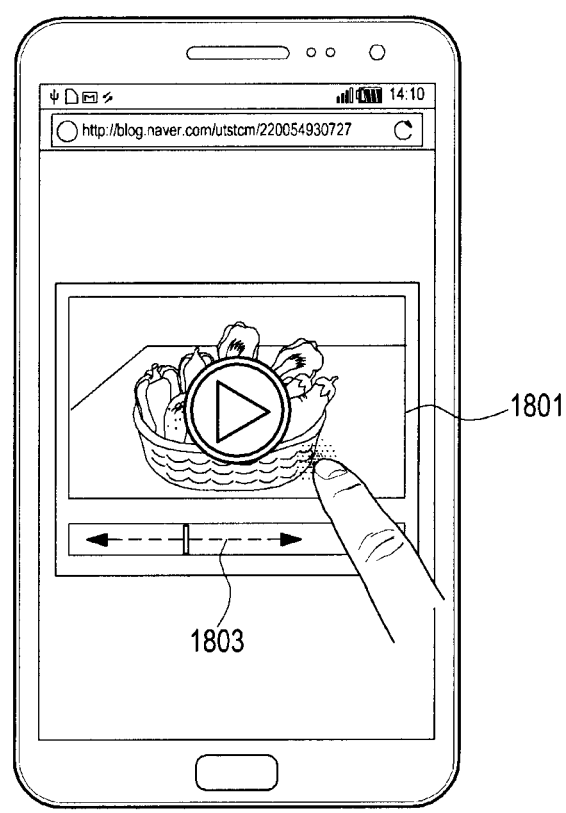
FIG. 18 illustrates a screen example for selecting contents in a web document displayed in an electronic device according to various embodiments of the present disclosure.
Figure 19:
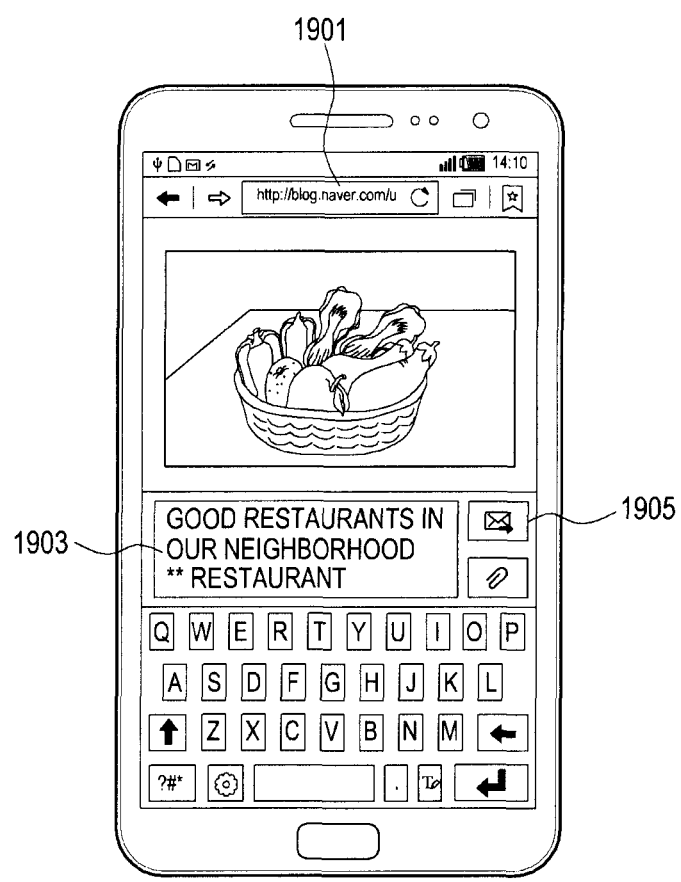
FIG. 19 illustrates a screen example for inputting contents related to a web document displayed in an electronic device according to various embodiments of the present disclosure.
Figure 20:
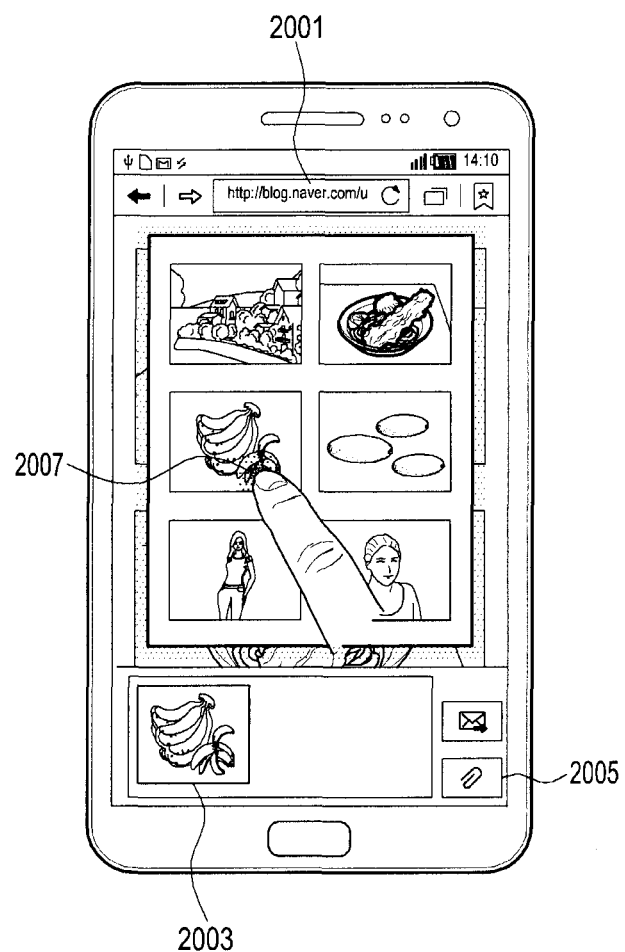
FIG. 20 illustrates a screen example for inputting contents related to a web document displayed in an electronic device according to various embodiments of the present disclosure.
Figure 21:
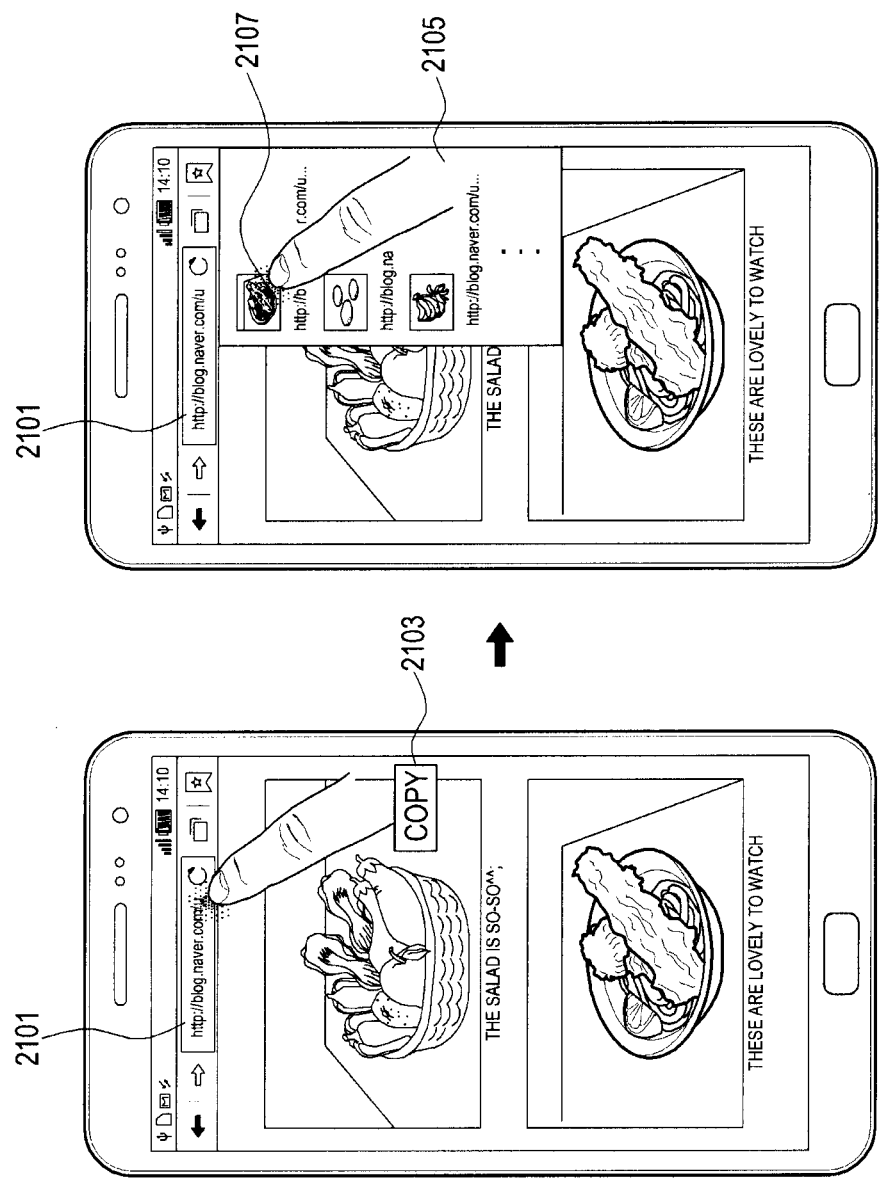
FIG. 21A and FIG. 21B illustrate a screen example for selecting address information, which has been previously stored to be associated with contents, when address information is copied in the electronic device according to various embodiments of the present disclosure.

FIG. 16 illustrates an operation process of the electronic device according to various embodiments of the present disclosure. FIGS. 17A and 17B and 18 illustrate screen examples for selecting contents in a web document displayed on the electronic device according to various embodiments of the present disclosure. FIGS. 19 and 20 illustrate screen examples for inputting contents related to a web document displayed on the electronic device according to various embodiments of the present disclosure. FIGS. 21A and 21B illustrates a screen example for selecting address information, which has been previously stored to be associated with contents, when address information is copied in the electronic device according to various embodiments of the present disclosure.

Referring to FIGS. 16, 17A and 17B, 18, 19, 20, and 21A and 21B, according to various embodiments of the present disclosure, the electronic device may execute a web browser according to a web execution request in operation 1601.

In operation 1603, the electronic device may display a web document in the executed web browser, and display address information (for example, a URL) for the web document in an address bar of the web browser or an area of the web document.

In operation 1605, the electronic device may select (for example, by at least one of the functions for copying, cutting, capturing, or sharing) the address information displayed in the address bar or the area of the web document according to a request of the user.

In operation 1607, the electronic device may receive a selection or an input of one or more contents in a current display area of the currently displayed web document from the user. Referring to FIGS. 17A and 17B, according to various embodiments, as the user selects (for example, copies 1703) address information 1701 displayed in an address bar or an area of the web document, and then selects one or more contents (for example, an image 1705) included in the web document, the electronic device may select the selected image 1705 as one or more contents to be stored in association with the selected address information. Referring to FIG. 18, according to various embodiments, when contents included in the web document are searched for and a dynamic image 1801 (e.g., a video) is selected in response to the copying of address information, the electronic device may display a dynamic image reproduction section (e.g., playback the video), capture an image of the dynamic image at a time point selected in a displayed reproduction section 1803 by the user (e.g., capture a frame from the video based on selection of a time-point for the video from a playback progress bar), and select the captured image as one or more contents to be stored to be associated with the selected address information.

In operation 1609, the electronic device may store the one or more selected or input contents and address information to be associated with each other.

In operation 1611, the electronic device may display the address information, which is selected according to the request for pasting or sharing the address information, along with one or more contents, which are stored in association with the address information, or transmit the address information and the one or more contents to another electronic device.

Referring now to FIG. 19, according to various embodiments, the electronic device may receive one or more pieces of information (for example, "good restaurants in our neighborhood:  restaurant") 1903 which may be related to the web document from the user, and display or transmit the one or more of the pieces of information received from the user along with the one or more contents stored associated with the selected address information 1901, as indicated by a transmission command represented by reference numeral 1905**.

Referring now to FIG. 20, according to various embodiments, when a menu button 2005 is selected, the electronic device may add and display an album, an image editing file, or conventionally selected and stored contents. When the user selects one or more contents (such as, for example, an image 2007) in the display screen, the electronic device may display and transmit selected one or more pieces of information (for example, a selected image 2003) related to the web document along with the one or more contents stored associated with selected address information 2001.

Referring now to FIGS. 21A and 21B, according to various embodiments, when address information 2101 displayed in an address bar is selected (for example, copied as indicated by reference numeral 2103), the electronic device may display a list 2105 including one or more contents stored in connection with the selected address information 2101. Further, the electronic device may select (or detect a selection of) one or more contents 2107 from the displayed list 2105. One or more contents included in the list 2105 may be contents, which have been previously received or pasted along with information related to a location which provides the selected web document. According to various embodiments, the electronic device may paste, that is, display and store address information associated with one or more contents in a memo or an edited file, and display a list including the stored information according to the selection of the address information of the currently displayed web document. The list may include, for example, one or more contents, which have been previously pasted or received with the address information. Further, the electronic device may store address information displayed associated with selected contents 2107 or transmit the address information to share it with another electronic device.

According to various embodiments, when the electronic device selects address information in the web document previously displayed through the web browser and then selects again the address information in the currently displayed document, the electronic device may select one piece of a plurality of address information selected according to a preset condition for selection of the address information. An operation process for selecting address information according to the repetitive selection of the address information will be described in detail.

Figure 22:
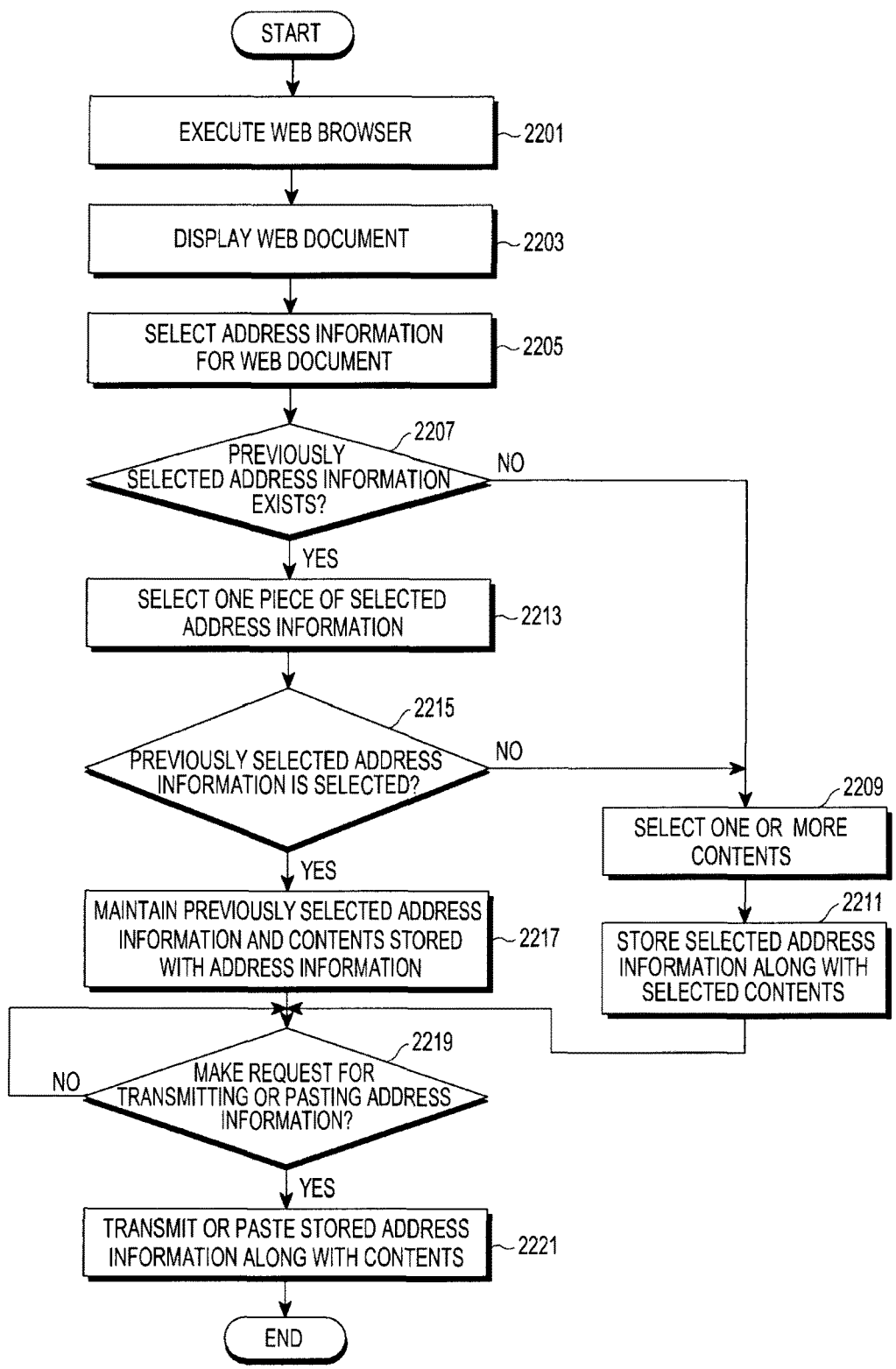
FIG. 22 illustrates an operation process of an electronic device according to various embodiments of the present disclosure.
Figures 23A, 23B:
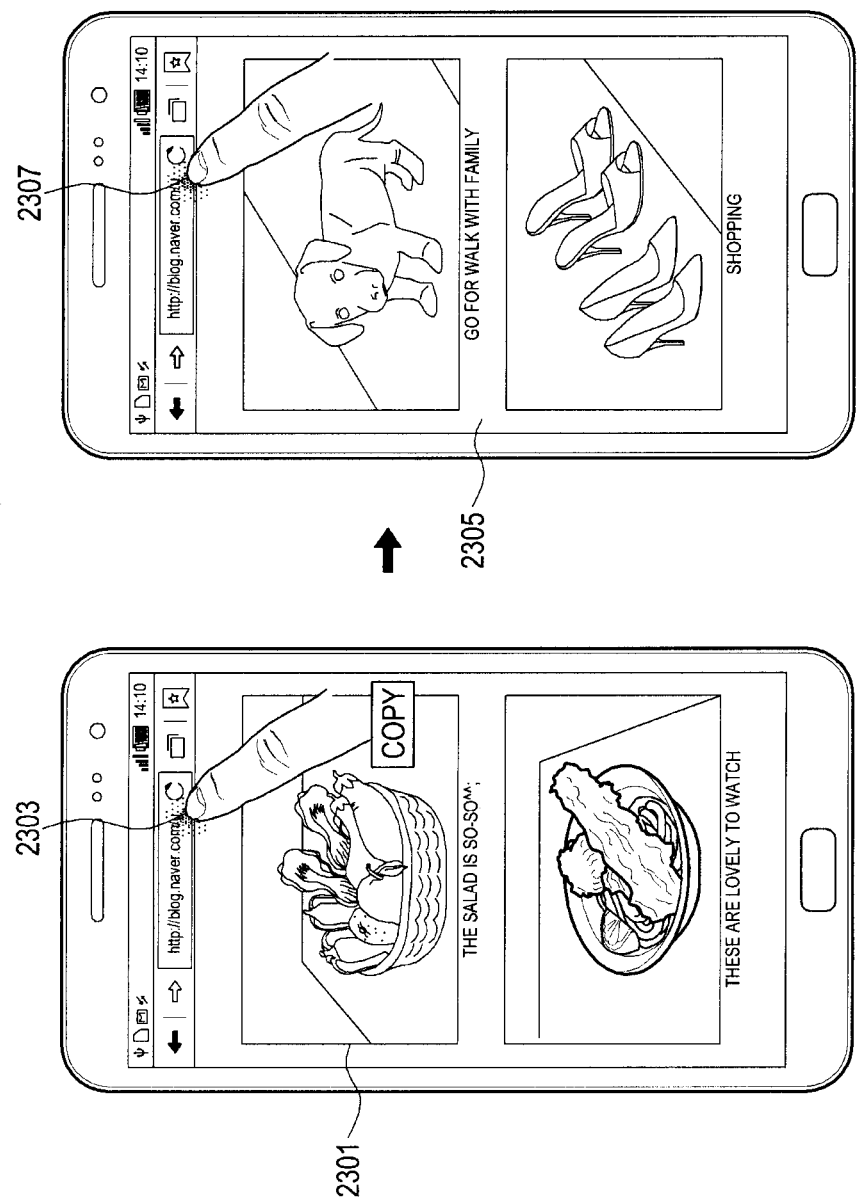
FIG. 23A and FIG. 23B illustrate a screen example for selecting address information in a web document displayed on an electronic device according to various embodiments of the present disclosure.
Figure 24:
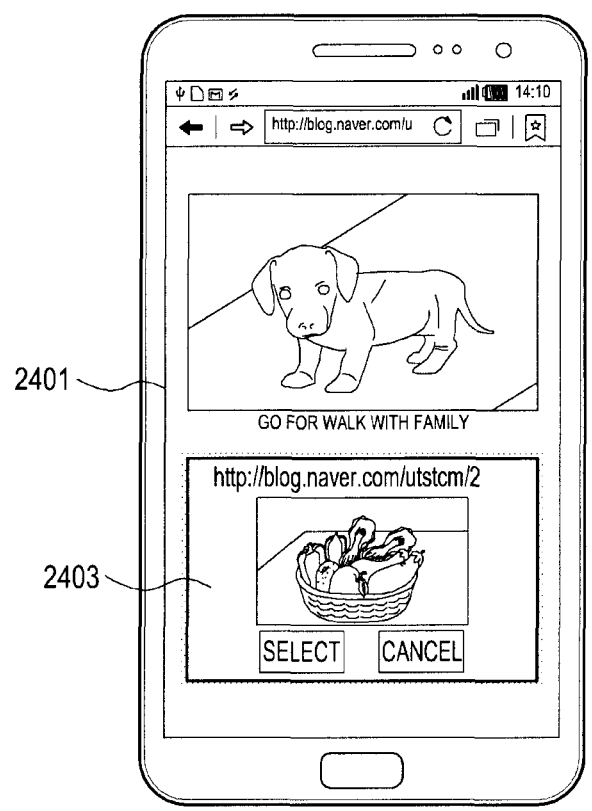
FIG. 24 illustrates a screen example for selecting address information according to various embodiments of the present disclosure.
Figure 25:
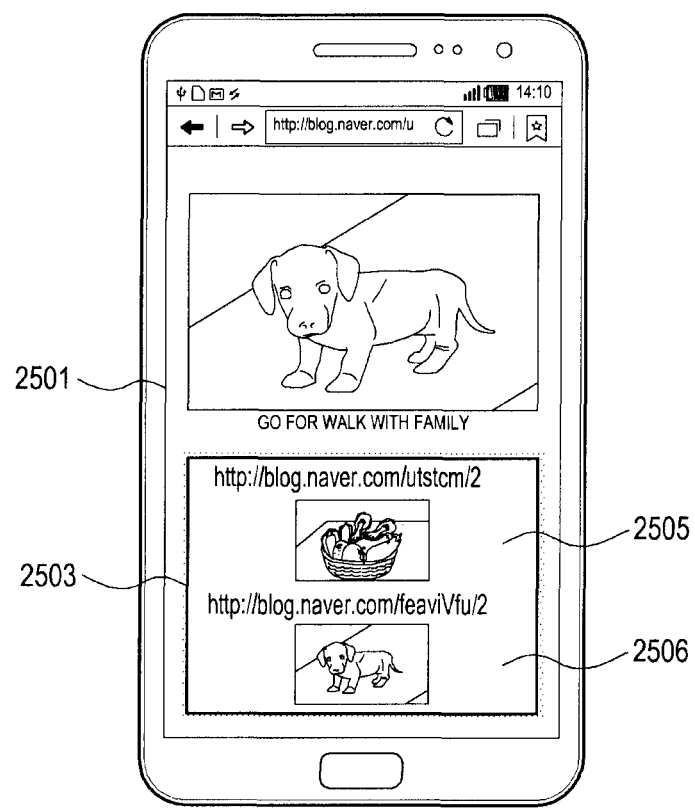
FIG. 25 illustrates a screen example for selecting address information according to various embodiments of the present disclosure.

FIG. 22 illustrates an operation process of the electronic device according to various embodiments of the present disclosure, FIGS. 23A, 23B and 24 illustrate screen examples for selecting address information in a web document displayed in the electronic device according to various embodiments of the present disclosure, and FIGS. 24 and 25 illustrate screen examples for selecting address information according to various embodiments of the present disclosure.

Referring to FIG. 22, according to various embodiments of the present disclosure, the electronic device may execute a web browser according to a web execution request in operation 2201.

In operation 2203, the electronic device may display a web document in the executed web browser and display address information of the currently displayed web document in an address bar of the web browser or an area of the web document.

In operation 2205, the electronic device may select (for example, by at least one of the functions of copying, cutting, capturing, or sharing) the address information (for example, first address information) of the current web document according to a request of the user.

In operation 2207, the electronic device identifies whether previously selected address information (for example, the first address information) exists. The electronic device may perform operation 2209 when the previously selected address information does not exist based on a result of the identification, and perform operation 2213 when the previously selected address information exists. The previously selected address information may be address information selected previously in the same web document as the currently displayed web document or address information selected in the previously displayed web document.

If previously selected address information does not exist, then in operation 2209, the electronic device may search for contents in the currently displayed web document according to a preset condition and select one or more contents. According to various embodiments, contents included in the current display area may be searched for according to a priority of the preset condition. For example, when an image is configured to have a highest priority to be searched for, the electronic device may preferentially search for the image. According to various embodiments, the electronic device may search for and select one or more contents to be stored to be associated with the address information according to a preset condition based on web configuration information (for example, DOM-related information and/or layout-related information) included in a currently displayed area and/or a hidden area of the web document. Further, various embodiments for searching for and selecting the one or more contents may be applied in the same way as that of the various embodiments of FIG. 2. According to various embodiments, the electronic device may configure a condition for selecting the contents such that the one or more contents are preferentially selected from images included in the currently displayed area, text of a specific mark, dynamic images, or information preset by the user.

In operation 2211, the electronic device may store the address information selected in the currently displayed screen along with the one or more selected contents.

Returning to operation 2207, if previously selected address information does exist, then the electronic device may select one piece from the selected address information in operation 2213.

In operation 2215, the electronic device may identify whether the previously selected address information is presently selected. When the previously selected address information is not selected based on a result of the identification, the electronic device may perform operation 2209 and further, delete the previously selected address information from a temporary storage space or a main storage space (not depicted in FIG. 22). When the previously selected address information is selected, the electronic device may perform operation 2217.

In operation 2217, the electronic device may maintain the previously selected address information and the one or more contents stored with the address information, and cancel the deletion or selection of the address information selected in the currently displayed screen.

In operation 2219, the electronic device may identify whether there is a request for pasting or sharing (or transmitting) the address information. When there is no request for pasting or sharing (or transmitting) the address information based on a result of the identification, the electronic device may continue to perform operation 2219.

When the request for pasting or sharing (or transmitting) the address information is received based on a result of the identification, the electronic device may display the one or more contents, which are stored to be associated with the address information, along with the address information, or transmit the one or more contents to another electronic device in operation 2221.

Referring to FIGS. 23A and 23B, according to various embodiments, the electronic device may select address information in a previously displayed web document 2301 according to, for example, a user's gesture, as indicated by reference numeral 2303, select one or more contents, and then store the selected address information along with the one or more selected contents. Thereafter, when address information is re-selected in a currently displayed web document 2305 as indicated by reference numeral 2307, then referring to FIG. 24, the electronic device may display a notification message 2403, which may indicate to a user that the previous address information exists, on a current execution screen displaying a web document 2401. The notification message 2403, which informs that the previous address information exists, may include one or more contents stored with the previously selected address information. Further, the notification message may include a selection button for selecting the previously selected address information and or a cancel button. According to various embodiments, when the electronic device receives an input of the selection button in FIG. 24, the electronic device may select the previously selected address information and delete or cancel the currently selected address information. In contrast, when the electronic device receives an input of the cancel button in FIG. 24, the electronic device may delete the previously selected address information and select the currently selected address information, and then select one or more contents to be stored with the selected address information. Further, for convenience of the description, it has been illustrated that the web documents 2301 and 2305 of FIGS. 23A and 23B are different web documents, but the web documents 2301 and 2305 may be the same web document according to various embodiments.

According to various embodiments, when the address information is selected, the electronic device may automatically select one or more contents to be stored with the address information according to a condition preset for the selection of the contents. Referring to FIG. 25, the electronic device may store the previously selected address information along with the one or more contents and, when the address information is selected again, may display a notification message 2503 for selecting one piece of selected address information 2505 and 2506. The selected address information 2505 and 2506 may be displayed with one or more contents automatically selected form a web document 2501 or stored contents. When one piece of selected address information 2505 and 2506 displayed in the notification message 2503 is selected, the electronic device may maintain the selected address information and delete the remaining address information.

According to various embodiments, the electronic device may store all pieces of address information without selecting the address information, which is repeatedly or continuously selected from the same web document or different web documents. The electronic device may sequentially or simultaneously paste or transmit a plurality of pieces of address information stored with one or more contents. Further, the previously selected address information may be stored with the currently selected address information in the temporary storage space without being deleted even though the current address information is selected until the execution of the web browser stops or for a preset period. According to various embodiments, when the current address information is selected, the previously selected address information may be stored in the main storage space without being deleted, and the currently selected address information may be stored in the temporary storage space.

According to various embodiments, when the electronic device selects address information, if there are no contents stored with the previously selected address information, the electronic device may delete the previously selected address information and select the currently selected address information. According to various embodiments, the electronic device may unconditionally ignore the previously selected address information and may select the currently selected address information. According to various embodiments, when one or more contents to be stored with the currently selected address information are not selected for a predetermined time, the electronic device may select the previously selected address information.

According to various embodiments, the electronic device may compare one or more contents (for example, first contents) stored with the previously selected address information and one or more contents (for example, second contents) selected or stored to be associated with the currently selected address information and select one or more address information according to a preset priority. For example, when the first contents corresponds to an image and the second contents to be stored with the currently selected address information in the same web document corresponds to text, the electronic device may select the previously selected address information stored with the first contents, which correspond to the image, according to a preset priority. According to various embodiments, the electronic device may identify source information of the first contents and the second contents (for example, web configuration information within the DOM structure) and select address information stored with contents corresponding to a higher node. For example, when the first contents are a higher node than the second contents, the electronic device may select the previously selected address information (for example, first address information) stored with the first contents.

According to various embodiments, when a plurality of pieces of address information are the same address information, the electronic device may merge one or more contents stored with each piece of address information and store the selected address information along with the merged contents.

Figure 26:
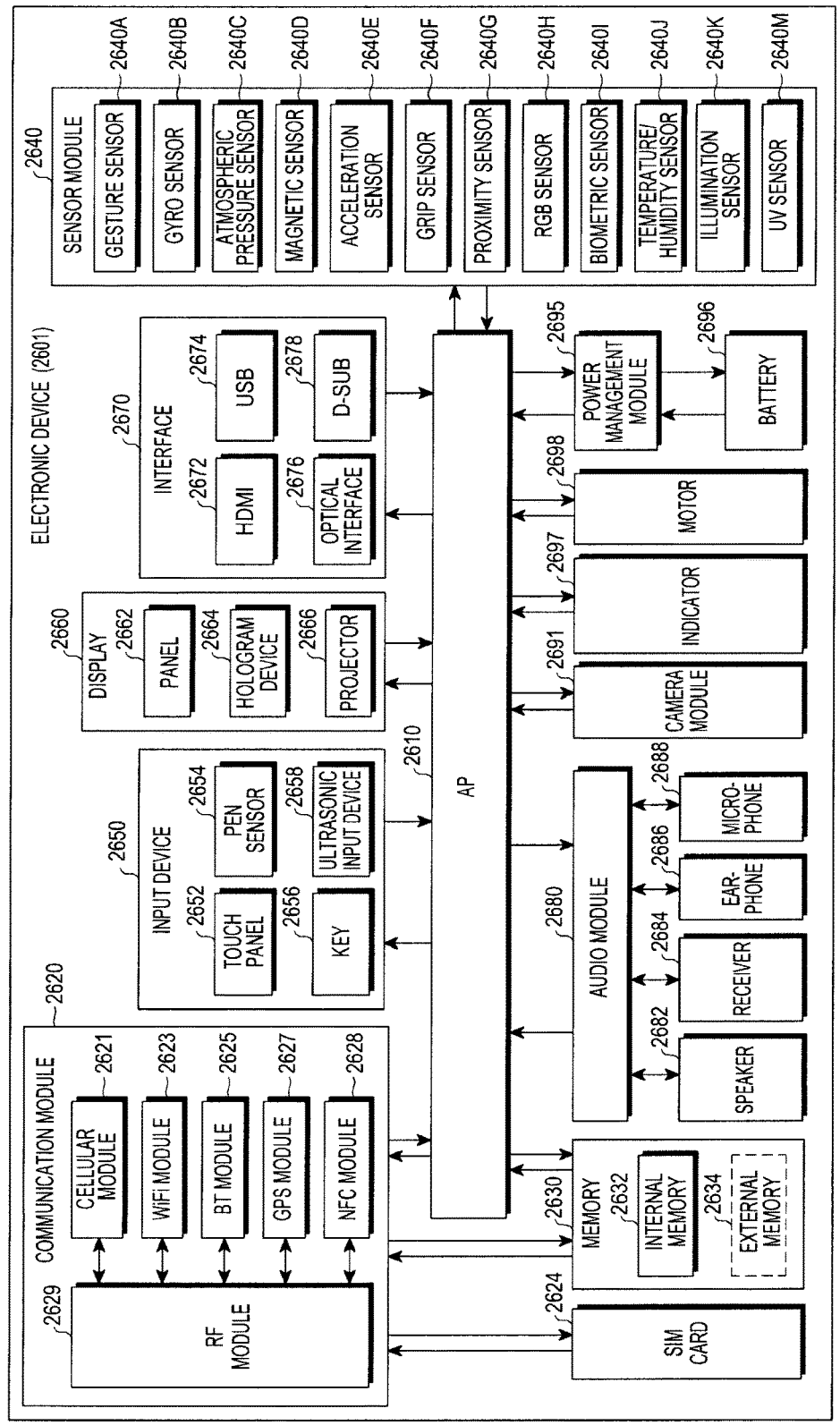
FIG. 26 illustrates a detailed structure of an electronic device according to various embodiments of the present disclosure.

FIG. 26 illustrates a detailed structure of an electronic device according to various embodiments of the present disclosure.

Referring to FIG. 26, an electronic device 2601 may include, for example, all or some of the electronic device 101 illustrated in FIG. 1. The electronic device 2601 may include at least one Application Processor (AP) 2610, a communication module 2620, a Subscriber Identification Module (SIM) card 2624, a memory 2630, a sensor module 2640, an input device 2650, a display 2660, an interface 2670, an audio module 2680, a camera module 2691, a power management module 2695, a battery 2696, an indicator 2697, and a motor 2698.

At least one AP 2610 may have a configuration identical or similar to that of at least one of the processor 120 and the information processing module 180 of FIG. 1, and may control a plurality of hardware or software elements connected to at least one AP 2610 by driving, for example, an operating system or an application program and may process various types of data and calculations. At least one AP 2610 may be implemented by, for example, a System on Chip (SoC). According to an embodiment, at least one AP 2610 may further include a Graphic Processing Unit (GPU) and/or an image signal processor. At least one AP 2610 may also include at least some (for example, a cellular module 2621) of the components illustrated in FIG. 26. At least one AP 2610 may load, into a volatile memory, instructions or data received from at least one (for example, a non-volatile memory) of the other elements and may process the loaded instructions or data, and may store various data in a non-volatile memory.

The communication module 2620 may have a configuration equal or similar to the communication module 170 of FIG. 1. The communication module 2620 may include, for example, a cellular module 2621, a Wi-Fi module 2623, a BT module 2625, a GPS module 2627, an NFC module 2628, and a Radio Frequency (RF) module 2629.

The cellular module 2621 may provide a voice call, video call, text message services, or Internet services through, for example, a communication network. According to an embodiment, the cellular module 2621 may identify and authenticate electronic devices 2601 within a communication network by using a subscriber identification module (for example, the SIM card 2624). According to an embodiment, the cellular module 2621 may perform at least some functions that at least one AP 2610 may provide. According to an embodiment, the cellular module 2621 may include a Communication Processor (CP).

Each of the Wi-Fi module 2623, the BT module 2625, the GPS module 2627, and the NFC module 2628 may include, for example, a processor for processing data transmitted/received through the corresponding module. According to any embodiment, at least some (for example, two or more) of the cellular module 2621, the Wi-Fi module 2623, the BT module 2625, the GPS module 2627, and the NFC module 2628 may be included in one Integrated Chip (IC) or IC package.

The RF module 2629 may transmit/receive, for example, a communication signal (for example, an RF signal). The RF module 2629 may include, for example, a transceiver, a Power Amp Module (PAM), a frequency filter, a Low Noise Amplifier (LNA), or an antenna. According to another embodiment, at least one of the cellular module 2621, the Wi-Fi module 2623, the BT module 2625, the GPS module 2627, and the NFC module 2628 may transmit/receive an RF signal through a separate RF module.

The SIM card 2624 may include a card including a subscriber identification module and/or an embedded SIM, and contain unique identification information (for example, an Integrated Circuit Card Identifier (ICCID)) or subscriber information (for example, an International Mobile Subscriber Identity (IMSI)).

The memory 2630 may have a configuration identical or similar to that of the memory 130 of FIG. 1. The memory 2630 may include, for example, an internal memory 2632 and an external memory 2634. The internal memory 2632 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disk drive, a Solid State Drive (SSD), and the like).

The external memory 2634 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 2634 may be functionally and/or physically connected to the electronic device 2601 through various interfaces.

The sensor module 2640 may measure, for example, a physical quantity or detect an operation state of the electronic device 2601, and may convert the measured or detected information to an electrical signal. The sensor module 2640 may include, for example, at least one of a gesture sensor 2640A, a gyro sensor 2640B, an atmospheric pressure sensor 2640C, a magnetic sensor 2640D, an acceleration sensor 2640E, a grip sensor 2640F, a proximity sensor 2640G, a color sensor 2640H (for example, red, green, and blue or "RGB" sensor), a biometric sensor 2640I, a temperature/humidity sensor 2640J, an illumination sensor 2640K, and an Ultra Violet (UV) sensor 2640M. Additionally or alternatively, the sensor module 2640 may include, for example, an E-nose sensor, an electromyography (EMG) sensor, an electroencephalogram (EEG) sensor, an electrocardiogram (ECG) sensor, an infrared (IR) sensor, an iris scanner, and/or a fingerprint sensor. The sensor module 2640 may further include a control circuit for controlling at least one sensor included therein. According to some embodiments, the electronic device 2601 may further include a processor that is configured as a part of at least one AP 2610 or a separate element from at least one AP 2610 to control the sensor module 2640, thereby controlling the sensor module 2640 while at least one AP 2610 is in a sleep state.

The input device 2650 may have a configuration identical or similar to that of the input/output interface 150 of FIG. 1, and include, for example, a touch panel 2652, a (digital) pen sensor 2654, a key 2656, or an ultrasonic input device 2658. The touch panel 2652 may use at least one of, for example, a capacitive type, a resistive type, an infrared type, and an ultrasonic type. The touch panel 2652 may further include a control circuit. The touch panel 2652 may further include a tactile layer, and provide a tactile reaction to a user.

The (digital) pen sensor 2654 may include, for example, a recognition sheet which is a part of the touch panel or a separate recognition sheet. The key 2656 may include, for example, a physical button, an optical key or a keypad. The ultrasonic input unit 2658 may input data through an input means that generates an ultrasonic signal, and the electronic device 2601 may identify data by detecting a sound wave with a microphone (for example, a microphone 2688).

The display 2660 may include a panel 2662, a hologram device 2664 or a projector 2666. The panel 2662 may include a configuration identical or similar to the display module 160 of FIG. 1. The panel 2662 may be embodied to be, for example, flexible, transparent, or wearable. The panel 2662 may also be configured to be integrated with the touch panel 2652 as a single module. The hologram device 2664 may show a stereoscopic image in the air by using interference of light. The projector 2666 may project light onto a screen to display an image. For example, the screen may be located inside or outside the electronic device 2601. According to an embodiment of the present disclosure, the display 2660 may further include a control circuit for controlling the panel 2662, the hologram device 2664, or the projector 2666.

The interface 2670 may include, for example, a High-Definition Multimedia Interface (HDMI) 2672, a Universal Serial Bus (USB) 2674, an optical interface 2676, or a D-subminiature (D-sub) 2678. The interface 2670 may be included in, for example, the communication module 170 illustrated in FIG. 1. Additionally or alternatively, the interface 2670 may include, for example, a Mobile High-definition Link (MHL) interface, a Secure Digital (SD) card/Multi-Media Card (MMC) interface, or an Infrared Data Association (IrDA) standard interface.

The audio module 2680 may bilaterally convert, for example, a sound and an electrical signal. At least some components of the audio module 2680 may be included in, for example, the input/output interface 150 illustrated in FIG. 1. The audio module 2680 may process sound information input or output through, for example, a speaker 2682, a receiver 2684, earphones 2686, the microphone 2688, or the like.

The camera module 2691 may photograph, for example, a still image or a moving image, and, according to one embodiment, may include one or more image sensors (for example, a front sensor or a rear sensor), a lens, an Image Signal Processor (ISP), or a flash (for example, an LED or a xenon lamp).

The power management module 2695 may manage, for example, power of the electronic device 2601. According to an embodiment, the power management module 2695 may include a Power Management Integrated Circuit (PMIC), a charger Integrated Circuit (IC), or a battery or fuel gauge. The PMIC may have a wired and/or wireless charging scheme. Examples of the wireless charging method may include, for example, a magnetic resonance method, a magnetic induction method, an electromagnetic method, and the like. Additional circuits (for example, a coil loop, a resonance circuit, a rectifier, etc.) for wireless charging may be further included. The battery gauge may measure, for example, the remaining amount of battery 2696, a charging voltage and current, or temperature. The battery 2696 may include, for example, a rechargeable battery and/or a solar battery.

The indicator 2697 may show particular statuses of the electronic device 2601 or a part (for example, the AP 2610) of the electronic device 2601, for example, a booting status, a message status, a charging status and the like. The motor 2698 may convert an electrical signal into mechanical vibrations, and may generate a vibration or haptic effect. Although not illustrated, the electronic device 2601 may include a processing device (for example, a GPU) for supporting mobile TV. The processing device for supporting mobile TV may process media data according to a standard of Digital Multimedia Broadcasting (DMB), Digital Video Broadcasting (DVB), media flow or the like.

Each of the components of the electronic device according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

Figure 27:
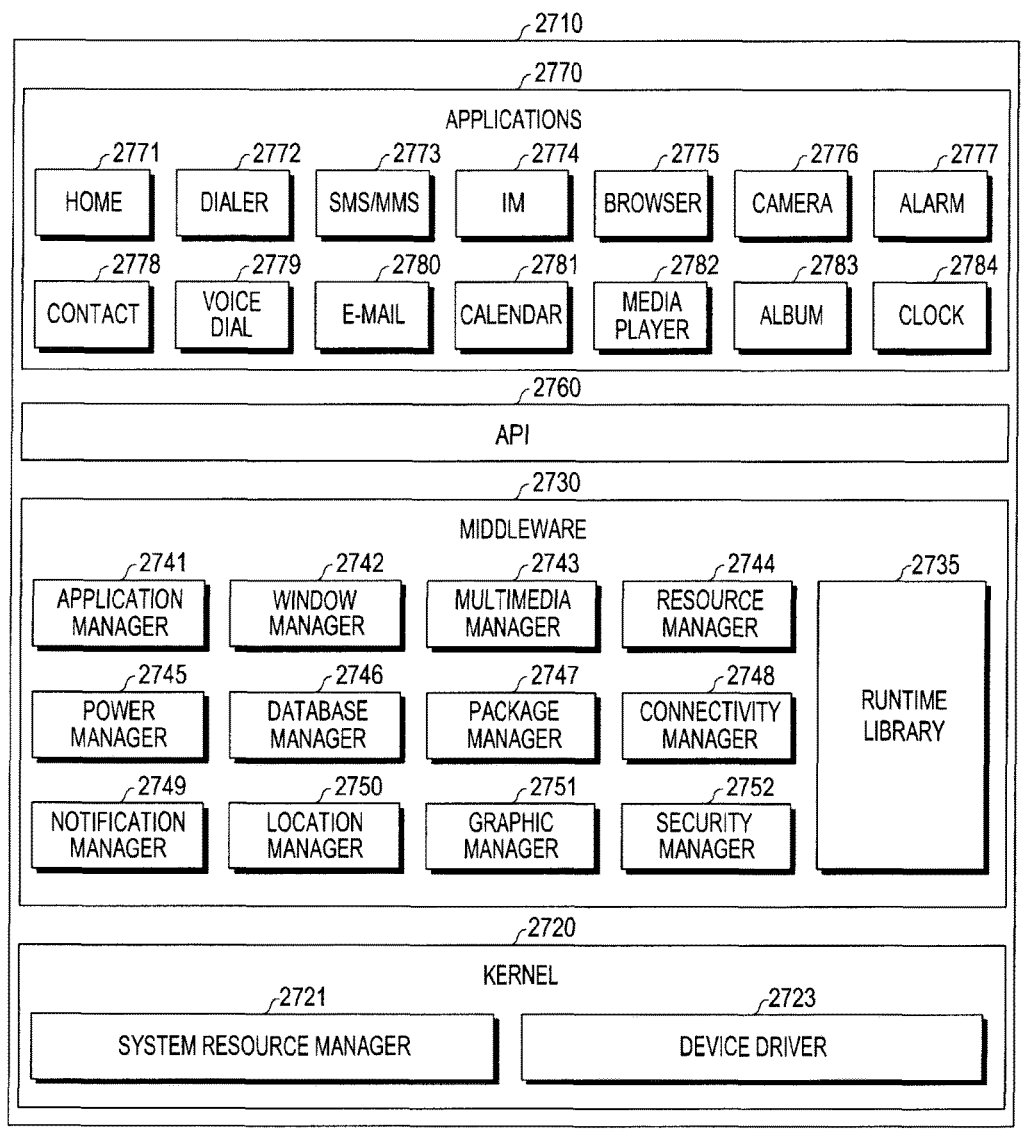
FIG. 27 illustrates a detailed structure of an electronic device according to various embodiments of the present disclosure.

FIG. 27 illustrates a detailed structure of an electronic device according to various embodiments of the present disclosure.

Referring to FIG. 27, the program module 2710 (for example, a program) according to various embodiments may include an Operating System (OS) for controlling resources related to the electronic device (for example, the electronic device 101) and/or various applications (for example, the applications 147) executed in the operating system. The operating system may be, for example, Android, iOS, Windows, Symbian, Tizen, Bada, or the like.

The program module 2710 may include a kernel 2720, middleware 2730, an Application Programming Interface (API) 2760, or applications 2770. At least some of the program module 2710 may be preloaded in the electronic device or downloaded from the server (for example, the server 106).

The kernel 2720 (for example, the kernel 141 of FIG. 1) may include, for example, a system resource manager 2721 or a device driver 2723. The system resource manager 2721 may control, allocate, or collect the system resources. According to an embodiment, the system resource manager 2721 may include a process management unit, a memory management unit, or a file system management unit. The device driver 2723 may include, for example, a display driver, a camera driver, a Bluetooth driver, a shared-memory driver, a USB driver, a keypad driver, a Wi-Fi driver, an audio driver, or an Inter-Process Communication (IPC) driver.

The middleware 2730 may provide a function utilized by the applications 2770 in common or provide various functions to the applications 2770 through the API 2760 so that the applications 2770 can efficiently use limited system resources of the electronic device. According to an embodiment, the middleware 2730 (for example, the middleware 143) may include at least one of a runtime library 2735, an application manager 2741, a window manager 2742, a multimedia manager 2743, a resource manager 2744, a power manager 2745, a database manager 2746, a package manager 2747, a connectivity manager 2748, a notification manager 2749, a location manager 2750, a graphic manager 2751, and a security manager 2752.

The runtime library 2735 may include, for example, a library module that a compiler uses in order to add new functions through a programming language while the applications 2770 are executed. The runtime library 2735 may perform input/output management, memory management, or a function for an arithmetic function.

For example, the application manager 2741 may manage a life cycle of at least one of the applications 2770. The window manager 2742 may manage a GUI resource used in a screen. The multimedia manager 2743 may detect a format utilized for reproducing various media files and encode or decode a media file using a codec appropriate for the corresponding format. The resource manager 2744 may manage resources, such as a source code, a memory, or a storage space, of at least one of the applications 2770.

The power manager 2745 may operate together with, for example, a Basic Input/Output System (BIOS), so as to manage a battery or power and may provide power information utilized for the operation of the electronic device. The database manager 2746 may generate, search for, or change a database to be used by at least one of the applications 2770. The package manager 2747 may manage the installation or the updating of applications distributed in a package file form.

The connectivity manager 2748 may manage wireless connections, for example, Wi-Fi or Bluetooth. The notification manager 2749 may display or notify of an event such as a received message, an appointment, a proximity notification, and the like to a user without disturbance. The location manager 2750 may manage location information of the electronic device. The graphic manager 2751 may manage graphic effects to be provided to a user and user interfaces related to the graphic effects. The security manager 2752 may provide various security functions utilized for system security or user authentication. According to an embodiment of the present disclosure, when the electronic device (for example, the electronic device 101) has a telephone call function, the middleware 2730 may further include a telephony manager for managing a voice or video call function of the electronic device.

The middleware 2730 may include a middleware module for forming a combination of various functions of the aforementioned components. The middleware 2730 may provide modules specialized according to the type of OS in order to provide differentiated functions. In addition, a few existing components may be dynamically removed from the middleware 2730, or new components may be added to the middleware 2730.

The API 2760 (for example, the API 145), which is a set of API programming functions, may be provided in a different configuration for each operating system. For example, with respect to each platform, one API set may be provided in a case of Android or iOS, and two or more API sets may be provided in a case of Tizen.

The applications 2770 (for example, the applications 147) may include one or more of a home application 2771, a diary application 2772, an SMS/MMS application 2773, an Instant Message (IM) application 2774, a browser application 2775, a camera application 2776, an alarm application 2777, a contact application 2778, a voice dial application 2779, and e-mail application 2780, a calendar application 2781, a media player application 2782, an album application 2783, a clock application 2784, a health care application (for example, an application for measuring a work rate or blood sugar), and an environmental information application (for example, an application for providing atmospheric pressure, humidity, or temperature information).

According to various embodiments, the applications 2770 may include an application (hereinafter, referred to as an "information exchange application" for convenience of the description) supporting information exchange between the electronic device (for example, the electronic device 101) and external electronic devices (for example, the electronic devices 102 and 104). The information exchange application may include, for example, a notification relay application for transmitting predetermined information to the external electronic device, or a device management application for managing the external electronic device.

For example, the notification relay application may include a function of transferring, to the external electronic device (for example, the electronic device 102 or 104), notification information generated from the other applications of the electronic device (for example, the SMS/MMS application, the e-mail application, the health management application, and the environmental information application). Further, the notification relay application may receive notification information from, for example, an external electronic device and provide the received notification information to a user. For example, the device management application may manage (for example, install, delete, or update) at least one function of the external electronic device (for example, the electronic device 104) communicating with the electronic device (for example, a function of turning on/off the external electronic device itself (or some elements) or a function of adjusting luminance (or a resolution) of the display), applications operating in the external electronic device, or services provided by the external electronic device (for example, a call service and a message service).

According to an embodiment, the applications 2770 may include an application (for example, health management application) designated according to attributes (for example, attributes of the electronic device such as the type of electronic device which corresponds to a mobile medical device) of the external electronic device (for example, the electronic device 102 or 104). According to an embodiment, the applications 2770 may include an application received from the external electronic device (for example, the server 106, or the electronic device 102 or 104). According to an embodiment, the applications 2770 may include a preloaded application or a third party application that can be downloaded from a server. The names of the components of the program module 2710 of the illustrated embodiment of the present disclosure may be changed according to the type of operating system.

According to various embodiments, at least a part of the program module 2710 may be implemented in software, firmware, hardware, or a combination of two or more thereof. At least some of the program module 2710 may be implemented (for example, executed) by, for example, the processor (for example, the AP 2760). At least some of the program module 2710 may include, for example, a module, program, routine, sets of instructions, process, or the like for performing one or more functions.

The term "module" or "functional unit" used herein may, for example, mean a unit including one of hardware, software, and firmware or a combination of two or more of them. The "module" may be interchangeably used with, for example, the term "unit", "logic", "logical block", "component", or "circuit". The "module" or "function unit" may be a minimum unit of an integrated component element or a part thereof. The "module" may be a minimum unit for performing one or more functions or a part thereof. The "module" or "function unit" may be mechanically or electronically implemented. For example, the "module" or "function unit" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added. According to various embodiments, a computer-readable recording medium having a program recorded therein to be executed in a computer is provided. The program may include executable instructions to instruct a processor to perform an operation of displaying a web document; an operation of selecting information related to a location, which provides the web document in response to a user's input, an operation of selecting one or more contents included in the web document in response to a selection of the information related to the location, which provides the displayed web document, and an operation of storing the one or more selected contents to be associated with the information related to the location, which provides the displayed web document when the program is executed by the processor.

Various embodiments of the present disclosure disclosed in this specification and the drawings are merely specific examples presented in order to easily describe technical details of the present disclosure and to help the understanding of the present disclosure, and are not intended to limit the present disclosure. Therefore, it should be construed that, in addition to the embodiments disclosed herein, all modifications and changes or modified and changed forms derived from the technical idea of various embodiments of the present disclosure fall within the present disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

What is claimed is:
1. An electronic device comprising:
a display configured to display a web document;
a memory; and
at least one processor operatively coupled to the memory and the display,
wherein the at least one processor is configured to:
control the display to display a web document corresponding to address information related to a web-based location using a web browser,
in response to detecting a first selection of address information displayed on the web browser, obtain a content object included in the web document for storage,
store in the memory the obtained content object in association with the address information,
in response to detecting a second selection of the address information after the obtained content object is stored in the memory, identify address information objects and content objects corresponding to the address information objects stored in the memory based on the address information,
control the display to display a list listing the identified address information objects and the identified content objects,
detect a user input selecting at least one content object from among the displayed list, and transmit the selected content object and the identified address information object corresponding to the selected content object to an external device.

2. The electronic device of claim 1, wherein the processor is further configured to control a communication module of the electronic device to transmit the selected content object and the address information object of the web document,
wherein the displayed list is disposed overlaying at least a portion of the web document on the web browser.

3. The electronic device of claim 1, wherein the processor is further configured to control the display to display the obtained content object in association with the address information.

4. The electronic device of claim 1, wherein the processor is further configured to:
control the display to display the selected content object and the identified address information object corresponding to the selected content object using a second application different from a first application executing the web browser.

5. The electronic device of claim 1, wherein the processor is further configured to:
when a current display area lacks any content object to be obtained, obtain the content object from a previously displayed area of the web document according to a priority of a preset condition,
wherein the content object is obtained based on a priority of a preset condition.

6. The electronic device of claim 1, wherein, when the displayed web document includes a dynamic image or a video, the processor is further configured to:
detect selection of a playback position within the dynamic image or the video and capture an image of the dynamic image or the video at selected playback position as the obtained content object.

7. The electronic device of claim 1, wherein the processor is further configured to execute at least one of:
controlling the display to display the selected content object in association with input information received via a user input related to the web document; and
controlling a communication module to transmit, to an external device, the input information, the selected content object and the identified address information object corresponding to the selected content object.

8. The electronic device of claim 1, wherein the processor is further configured to:
control the display to display the address information in association with at least one content object that is previously received or pasted by the electronic device, and
select the displayed content object that are previously received or pasted as the content object stored in association with the address information for the web document.

9. The electronic device of claim 1, wherein the processor is configured to obtain the content object according to a condition set based on at least one piece of Document Object Model (DOM)-related information and layout-related information in response to detecting selection of the address information of the web document.

10. A method of processing information in an electronic device, the method comprising:
controlling a display of the electronic device to display a web document corresponding to address information related to a web-based location using a web browser;
in response to detecting a first selection of address information displayed on the web browser, obtaining a content object included in the displayed web document for storage;
storing the obtained content object in associating with the address information in a memory of the electronic device;
in response to detecting a second selection of the address information after the obtained content object is stored, identifying address information objects and content objects corresponding to the address information objects stored in the memory based on the address information;
controlling the display to display a list listing the identified address information objects and the identified content objects;
detecting a user input selecting at least one content object from among the displayed list; and
transmitting the selected content object and the identified address information object corresponding to the selected content object to an external device.

11. The method of claim 10, further comprising controlling the display to display the obtained content object in associating with the address information of the web document.

12. The method of claim 10,
wherein the displayed list is disposed overlaying at least a portion of the web document on the web browser.

13. The method of claim 10, wherein the selecting of the content included in the web document further comprises:
identifying whether any content objects to be obtained is present in a current display area of the web document; and
when the currently display area lacks any content object to be obtained, obtaining the content object from a previously displayed area of the web document according to a priority of a preset condition,
wherein the content object is obtained based on a priority of a preset condition.

14. The method of claim 10, wherein the selecting of the content included in the web document further comprises:
when the web document includes a dynamic image or a video, detecting selection of a playback position within the dynamic image or the video and capturing an image of the dynamic image or video at the selected playback position as the obtained content object.

15. The method of claim 10, wherein the selecting of the content included in the web document further comprises:
controlling the display to display the address information in association of the web document in association with at least one content object that is previously received or pasted by the electronic device; and
select the displayed content object that are previously received or pasted as the content object stored in association with the address information of the web document.

16. The method of claim 10, wherein the selecting of the content included in the web document further comprises:
obtaining the content object according to a condition set based on at least one piece of Document Object Model (DOM)-related information and layout-related information in response to the selection of the address information of the web document.

17. The method of claim 10, further comprising:
receiving input information related to the web document; and
executing at least one of:
  displaying the selected content object in association with the input information and
  transmitting, to an external device, the selected content object and the identified address information object corresponding to the selected content object.

18. A non-transitory computer-readable recording medium having a program, the program comprising executable instructions to cause a processor to perform operations when the program is executed by the processor, the operations comprising:
controlling a display of an electronic device to display a web document corresponding to address information related to a web-based location using a web browser;
in response to detecting a first selection of address information displayed on the web browser, obtaining content object included in the displayed web document for storage;
storing the obtained content object in associating with the address information in a memory of the electronic device;
in response to detecting a second selection of the address information after the obtained content object is stored, identifying address information objects and content objects corresponding to the address information objects stored in the memory based on the address information;
controlling the display to display a list listing the identified address information objects and the identified content objects;
detecting a user input selecting at least one content object from among the displayed list; and
transmitting the selected content object and the identified address information object corresponding to the selected content object to an external device.

* * * * *